(12) United States Patent
Lipson et al.

(10) Patent No.: US 9,291,509 B2
(45) Date of Patent: Mar. 22, 2016

(54) HIGH-SPEED OPTICAL SAMPLING BY TEMPORAL STRETCHING USING FOUR-WAVE MIXING

(75) Inventors: Michal Lipson, Ithaca, NY (US);
Alexander Gaeta, Ithaca, NY (US);
Reza Salem, Columbia, MD (US);
Mark Foster, Sparks Glencoe, MD (US); David Geraghty, Menlo Park, CA (US); Amy Foster, Sparks Glencoe, MD (US)

(73) Assignee: Cornell University, Ithaca, NY (US)

( * ) Notice: Subject to any disclaimer, the term of this patent is extended or adjusted under 35 U.S.C. 154(b) by 682 days.

(21) Appl. No.: 13/147,966

(22) PCT Filed: Feb. 4, 2010

(86) PCT No.: PCT/US2010/023195
§ 371 (c)(1),
(2), (4) Date: Dec. 15, 2011

(87) PCT Pub. No.: WO2010/091180
PCT Pub. Date: Aug. 12, 2010

(65) Prior Publication Data
US 2012/0093519 A1    Apr. 19, 2012

Related U.S. Application Data

(60) Provisional application No. 61/150,270, filed on Feb. 5, 2009.

(51) Int. Cl.
*G02B 6/26* (2006.01)
*H04B 10/04* (2006.01)
*G01J 11/00* (2006.01)

(52) U.S. Cl.
CPC .................................. *G01J 11/00* (2013.01)

(58) Field of Classification Search
CPC ............. H04B 10/291; H04B 10/2912; H04B 10/2916; H04B 10/077
USPC .................................. 398/157, 140, 199, 204
See application file for complete search history.

(56) References Cited

U.S. PATENT DOCUMENTS 4,928,316 A * 5/1990 Heritage ............... H01S 3/0057
398/199
5,457,559 A * 10/1995 Saito et al. ....................... 398/98
(Continued)

FOREIGN PATENT DOCUMENTS

| CN | 1155795 A | 7/1997 |
|---|---|---|
| EP | 0753944 | 1/1997 |
| EP | 0774844 | 5/1997 |

OTHER PUBLICATIONS

C. Bennet ["Principles of Parametric Temporal Imaging: I. System Configurations" IEEE Journal of Quantum Electronics, Oct. 25, 1999].*

(Continued)

*Primary Examiner* — Oommen Jacob
(74) *Attorney, Agent, or Firm* — Perkins Coie LLP

(57) ABSTRACT

Systems and methods are provided for ultrafast optical waveform sampling based on temporal stretching of an input signal waveform. Temporal stretching is performed using a time lens based on four-wave mixing in a nonlinear medium. The signal is passed through an input dispersive element. The dispersed signal is sent into the time lens, which comprises a chirped pump pulse and a nonlinear medium. The chirped pump pulse is combined with the signal. The four-wave mixing process occurs in the nonlinear device or medium, which results in the generation of a signal at a new optical frequency (idler). The idler is spectrally separated from the signal and pump pulse using a bandpass filter and sent into an output dispersive element. The output dispersive element is longer than the input dispersive element and the temporal stretching factor is given by the ratio between the dispersions of these two elements.

43 Claims, 10 Drawing Sheets

(56) References Cited

U.S. PATENT DOCUMENTS

Figure 1:
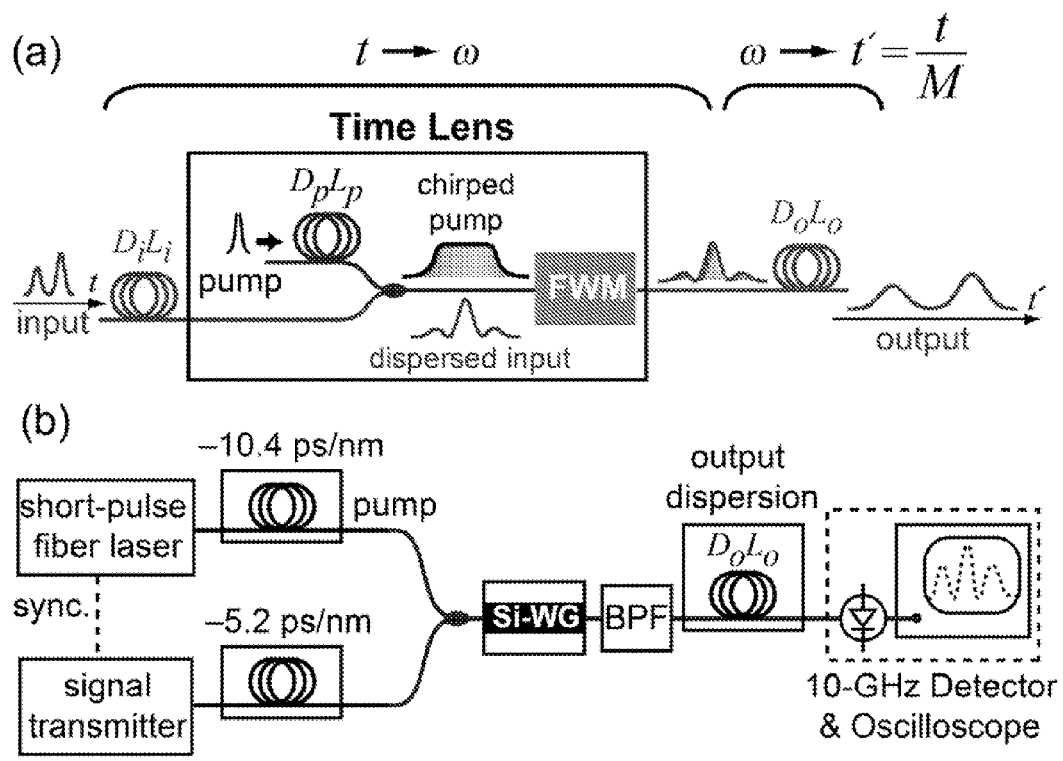

| | | | | |
|---|---|---|---|---|
| 5,777,766 | A * | 7/1998 | Fontana | H04L 7/0075 398/154 |
| 5,861,970 | A * | 1/1999 | Tatham | H01S 5/50 398/150 |
| 6,288,659 | B1 * | 9/2001 | Jalali | H03M 1/1215 341/137 |
| 6,529,314 | B1 | 3/2003 | Shukunami et al. | |
| 8,275,263 | B1 * | 9/2012 | Franklin | H04B 10/506 398/182 |
| 8,571,421 | B2 * | 10/2013 | Willis | H04B 10/50 398/182 |
| 2003/0048503 | A1 * | 3/2003 | Aso | G02F 1/3536 398/79 |
| 2003/0118303 | A1 * | 6/2003 | Evans | H04B 10/25077 385/122 |
| 2004/0100681 | A1 * | 5/2004 | Bjarklev | B82Y 20/00 359/326 |
| 2005/0063040 | A1 * | 3/2005 | Lee | G02F 2/002 359/326 |
| 2006/0092500 | A1 * | 5/2006 | Melloni | G02F 1/3534 359/330 |
| 2006/0204170 | A1 * | 9/2006 | Igarashi et al. | 385/24 |
| 2008/0152360 | A1 * | 6/2008 | Bennett | 398/204 |
| 2008/0240651 | A1 * | 10/2008 | Rong | G02F 1/3538 385/27 |

OTHER PUBLICATIONS

Salem, Reza et al. Optical time lens based on four-wave mixing on a silicon chip May 15, 2008 Optics Letters vol. 33 No. 10 (pp. 1047-1049).
Foster, Mark A. et al. Silicon-chip-based ultrafast optical oscilloscope Nature vol. 456(6) Nov. 2008 (pp. 81-84 and unnumbered Methods page doi:10.1038/nature07430).
International Search Report and Written Opinion of the International Searching Authority for PCT/US10/23195 mailed Sep. 30, 2010 (9 pp.).
Foster, M. A. et al., Broad-Band Continuous-Wave Parametric Wavelength Conversion in Silicon Nanowaveguides, Optics Express, 2007, vol. 15, No. 20, pp. 12949-12958.
Akhmanov, S. A., et al., "Self-action of wave packets in a nonlinear medium and femtosecond laser pulse generation," *Sov. Phys. Usp.*, 29:642-677, Jul. 1986.
Azana, J., et al., "Real-time optical spectrum analysis based on the time-space duality in chirped fiber gratings," *IEEE J. Quantum Electron.*, 36(5):517-526, May 2000.
Azana, J., et al., "Spectral Fraunhofer regime: time-to-frequency conversion by the action of a single time lens on an optical pulse," *Appl. Opt.*, 43(2):483-490, Jan. 2004.
Bennett, C. V., et al., "640 GHz real-time recording using temporal imaging," *Conference on Lasers and Electro-Optics, OSA Technical Digest Series, Optical Society of America*, 2008.
Bennett, C. V., et al., "Temporal magnification and reversal of 100 Gb/s optical data with an upconversion time microscope," *Appl. Phys. Lett.*, 65(20):2513-2515, Nov. 1994.
Bennett, C. V., et al., "Upconversion time microscope demonstrating 103x magnification of femtosecond waveforms," *Opt. Lett.*, 24(11):783-785, Jun. 1999.
Bennett, C. V., et al., "Principles of parametric temporal imaging—Part I: system configurations," *IEEE J. Quantum Electron.*, 36(4):430-437, Apr. 2000.
Bennett, C.V., et al., "Guided-wave temporal imaging based ultrafast recorders," *Science Conference and Photonic Applications Systems Technologies, OSA Technical Digest Series, Optical Society of America*, 2007.
Bromage, J., et al., "Highly sensitive, single-shot characterization for pulse widths from 0.4 to 85 ps using electro-optic shearing interferometry," *Opt. Lett.*, 31(23):3523-3525, Dec. 2006.
Cheben, P., et al., "A high-resolution silicon-on-insulator arrayed waveguide grating microspectrometer with submicrometer aperture waveguides," *Opt. Express*, 15(5):2299-2306, Mar. 2007.

Chou, J., et al., "Femtosecond real-time single-shot digitizer," *Appl. Phys. Lett.*, 91:161105-161105-3, Oct. 2007.
Chung, J. H., et al., "Real-time detection of femtosecond optical pulse sequences via time-to-space conversion in the lightwave communications band," *J. Lightwave Technol.*, 21(12):3323-3333, Dec. 2003.
Deng, K. L., "Single-shot optical sampling oscilloscope for ultrafast optical waveforms," *Lasers and Electro-Optics*, CLEO 98:268-269, 1998.
Dorrer, C. "Single-shot measurement of the electric field of optical waveforms by use of time magnification and heterodyning," *Opt. Lett.*, 31(4):540-542, Feb. 2006.
Dorrer, C., "High-speed measurements for optical telecommunication systems," *IEEE J. Sel. Top. Quantum Electron.*, 12(4):843-858, Jul./Aug. 2006.
Dorrer, C., et al., "High-dynamic-range single-shot cross-correlator based on an optical pulse replicator," *Opt. Express*, 16(18):13534-13544, Sep. 2008.
Dorrer, C., et al., "Measurement of eye diagrams and constellation diagrams of optical sources using linear optics and waveguide technology," *J. Lightwave Technol.*, 23(1):178-186, Jan. 2005.
Dorrer, C., et al., "Single-shot real-time characterization of chirped-pulse amplification systems by spectral phase interferometry for direct electric-field reconstruction," *Opt. Lett.*, 24(22): 1644-1646, Nov. 1999.
Dudley, J. M., et al., "Self-similarity in ultrafast nonlinear optics," *Nature Physics*, 3:597-603, Sep. 2007.
Dulkeith, E., et al., "Group index and group velocity dispersion in silicon-on-insulator photonic wires," *Opt. Express*, 14(9):3853-3863, May 2006.
Espinola, R. L., et al., "C-band wavelength conversion in silicon photonic wire waveguides," *Opt. Express*, 13(11):4341-4349, May 2005.
Fernandez-Pousa, C. R., "Temporal resolution limits of time-to-frequency transformations," *Opt. Lett.*, 31(20):3049-3051, Oct. 2006.
Foster, M. A., et al., "Broad-band continuous-wave parametric wavelength conversion in silicon nanowaveguides," *Opt. Express*, 15(20):12949-12958, Oct. 2007.
Foster, M.A., et al., "Silicon-chip-based ultrafast optical oscilloscope," *Nature*, 456(6):81-84, Nov. 2008.
Foster, M. A., et al., "Broad-band optical parametric gain on a silicon photonic chip," *Nature*, 441:960-963, Jun. 2006.
Jalali, B., "Can silicon change photonics?," *Physics Status Solid.*, 205(2):213-224, 2008.
Kan'an, A. M., et al., "Efficient time-to-space conversion of femtosecond optical pulses," *J. Opt. Soc. Am.*, 15(3):1242-1245, Mar. 1998.
Kane, D. J., et al., "Single-shot measurement of the intensity and phase of an arbitrary ultrashort pulse by using frequency-resolved optical gating," *Opt. Lett.*, 18(10):823-825, May 1993.
Kauffman, M. T., et al., "Time-to-frequency converter for measuring picosecond optical pulses," *Appl. Phys. Lett.*, 64(3):270-272, Jan. 1994.
Koch, B. R., et al., "Mode-locked silicon evanescent lasers," *Opt. Express*, 15(18):11225-11233, Sep. 2007.
Kolner, B. H. "Space-time duality and the theory of temporal imaging," *IEEE J. Quantum Electron.*, 30(8):1951-1963, Aug. 1994.
Kolner, B. H., "Active pulse compression using an integrated electro-optic phse modulator," *Appl. Phys. Lett.*, 52(14):1122-1124, Apr. 1988.
Kuo, Y. H., et al., "Demonstration of wavelength conversion at 40 Gb/s data rate in silicon waveguides," *Opt. Express*, 14(24):11721-11726, Nov. 2006.
Li, J., et al., "0.5-Tb/s eye-diagram measurement by optical sampling using XPM-induced wavelength shifting in highly nonlinear fiber," *IEEE Photon. Technol. Lett.*, 16(2):566-568, Feb. 2004.
Lin, Q., et al., "Ultrabroadband parametric generation and wavelength conversion in silicon waveguides," *Opt. Express*, 14(11):4786-4799, May 2006.
Mouradian, L. K., et al., "Spectro-temporal imaging of femtosecond events," *IEEE J. Quantum Electron.*, 36(7):795-801, Jul. 2000.
Oba, K., et al., "Femtosecond single-shot correlation system: A time-domain approach," *Appl. Opt.*, 38(17):3810-3817, Jun. 1999.

(56) References Cited

OTHER PUBLICATIONS

Salem, R., et al., "Optical time lens based on four-wave mixing on a silicon chip," *Opt. Lett.*, 33(10):1047-1049, May 2008.
Salem, R., et al., "Signal regeneration using low-power four-wave missing on silicon chip," *Nat. Photonics*, 2:35-38, Jan. 2008.
Salem, R., et al., "All-optical regeneration on a silicon chip," *Opt. Express*, 15(12):7802-7809, Jun. 2007.
Schoenlein, R. W., "Femtosecond studies of nonequilibrium electronic processes in metals," *Phys. Rev. Lett.*, 58(16):1680-1683, Apr. 1987.
Solli, D. R., et al., "Amplified wavelength-time transformation for real-time spectroscopy," *Nat. Photonics*, 2:48-51, Jan. 2008.
Solli, D. R., et al., "Optical rogue waves," *Nature*, 450:1054-1057, Dec. 2007.
Sun, P.C., et al., "Femtosecond pulse imaging: ultrafast optical oscilloscope," *J. Opt. Soc. Am. A*, 14(5):1159-1170, May 1997.
Takagi, Y., et al., "Ultrafast single-shot optical oscilloscope based on time-to-space conversion due to temporal and spatial walk-off effects in nonlinear mixing crystal," *Jpn. J. Appl. Phys.*, 44(9A):6546-6549, 2005.
Tonouchi, M., "Cutting-edge terahertz technology," *Nat. Photonics*, 1:97-105, Feb. 2007.
Turner, A. C., et al., "Tailored anomalous group-velocity dispersion in silicon channel waveguides," *Opt. Express*, 14(10):4357-4362, May 2006.
Van Howe, J., et al., "Generation of 3.5 nJ femtosecond pulses from a continuous-wave laser without mode locking," *Opt. Lett.*, 32(11):1408-1410, Jun. 2007.
Van Howe, J., et al., "Ultrafast optical signal processing based upon space-time dualities," *J. Lightwave Technol.*, 24(7):2649-2662, Jul. 2006.
Van Howe, J., et al., "Ultrafast optical delay line by use of a time-prism pair," *Opt. Lett.*, 30(1):99-101, Jan. 2005.
Van Kampen, M.,. et al., "All-optical probe of coherent spin waves," *Phys. Rev. Lett.*, 88(22):227201-1-4, Jun. 2002.
Westlund, M., et al., "High-performance optical-fiber-nonlinearity-based optical waveform monitoring," *J. Lightwave Technol.*, 23(6):2012-2022, Jun. 2005.
Yamada, N., "Polarization-insensitive optical sampling system using two KTP crystals," *IEEE Photon. Technol. Lett.*, 16(1):215-217, Jan. 2004.

\* cited by examiner

HIGH-SPEED OPTICAL SAMPLING BY TEMPORAL STRETCHING USING FOUR-WAVE MIXING

CROSS-REFERENCE TO RELATED APPLICATIONS

This application is a national stage application under 35 U.S.C. §371 of PCT Application No. PCT/US2010/023195, filed Feb. 4, 2010, entitled High-Speed Optical Sampling By Temporal Stretching Using Four-Wave Mixing, which claims priority to and the benefit of U.S. provisional patent application Ser. No. 61/150,270, entitled High-Speed Optical Sampling by Temporal Stretching Using Four-Wave Mixing, by Lipson et al., filed Feb. 5, 2009, which is incorporated herein by reference in its entirety.

STATEMENT REGARDING FEDERALLY SPONSORED RESEARCH OR DEVELOPMENT

The disclosed invention was made with government support under the DSO OAWG Program from DARPA and under a grant to the Center for Nanoscale Systems from the National Science Foundation. The government has rights in this invention.

1. TECHNICAL FIELD

The present invention relates to methods and devices for ultrafast optical waveform sampling based on temporal stretching of an input signal waveform.

2. BACKGROUND OF THE INVENTION

Photodiodes are currently used in conjunction with real-time oscilloscopes; however the sampling rate is limited to 60 GS/s, which is capable of processing signals with up to 30 GHz bandwidth. Current optical sampling systems use short optical pulses for high-resolution sampling. These systems, however, cannot operate single-shot and therefore cannot sample short optical packets or work with non-repetitive waveforms.

Autocorrelation and cross-correlation may also be used, however the optical signal must be deduced from the result and a single shot measurement is not possible over record lengths longer than a few picoseconds.

Other known methods include Frequency Resolved Optical Gating (FROG) and Spectral Phase Interferometry for Direct Electric-field Reconstruction (SPIDER), However, the record length for single-shot characterization using these techniques is limited to a couple of picoseconds.

Characterizing ultrafast optical signals has far-reaching applications in many areas of science and technology such as ultrafast phenomena (M. van Kampen, C. Jozsa, J. T. Kohlhepp, P. LeClair, L. Lagae, W. J. M. deJonge, and B. Koopmans, "All-optical probe of coherent spin waves," Phys. Rev. Lett. 88, 227201-1-4 (2002); R. W. Schoenlein, W. Z. Lin, and J. G. Fujimoto, "Femtosecond studies of nonequilibrium electronic processes in metals," Phys. Rev. Lett. 58, 1680-1683 (1987)), terahertz spectroscopy (M. Tonouchi, "Cutting-edge terahertz technology," Nature Photonics 1, 97-105 (2007)), and ultrahigh-bandwidth communications (C. Dorrer, "High-speed measurements for optical telecommunication systems," IEEE J. Sel. Top. Quantum Electron. 12, 843-858 (2006); N. Yamada, H. Ohta, and S. Nogiwa, "Polarization-insensitive optical sampling system using two KTP crystals," IEEE Photon. Technol. Lett. 16, 215-217 (2004); M. Westlund, P. A. Andrekson, H. Sunnerud, J. Hansryd, and J. Li, "High-performance optical-fiber-nonlinearity-based optical waveform monitoring," J. Lightwave Technol. 20, 2012-2022 (2005); J. Li, M. Westlund, H. Sunnerud, B.-E. Olsson, M. Karlsson, and P. A. Andrekson, "0.5-Tb/s eye-diagram measurement by optical sampling using XPM-induced wavelength shifting in highly nonlinear fiber," IEEE Photon. Technol. Lett. 16, 566-568 (2004); C. Dorrer, C. R. Doerr, I. Kang, R. Ryf, J. Leuthold, and P. J. Winzer, "Measurement of eye diagrams and constellation diagrams of optical sources using linear optics and waveguide technology," J. Lightwave Technol. 23, 178-186 (2005)). The traditional optoelectronic approach for optical signal sampling uses high-speed detectors and sample-and-hold circuits, which cannot be applied to signals that have excessively large bandwidths. One approach proposed to overcome this bandwidth problem is based on performing a cross-correlation with a short optical pulse train (C. Dorrer, "High-speed measurements for optical telecommunication systems," IEEE J. Sel. Top. Quantum Electron. 12, 843-858 (2006); N. Yamada, H. Ohta, and S. Nogiwa, "Polarization-insensitive optical sampling system using two KTP crystals," IEEE Photon. Technol. Lett. 16, 215-217 (2004); M. Westlund, P. A. Andrekson, H. Sunnerud, J. Hansryd, and J. Li, "High-performance optical-fiber-nonlinearity-based optical waveform monitoring," J. Lightwave Technol. 20, 2012-2022 (2005); J. Li, M. Westlund, H. Sunnerud, B.-E. Olsson, M. Karlsson, and P. A. Andrekson, "0.5-Tb/s eye-diagram measurement by optical sampling using XPM-induced wavelength shifting in highly nonlinear fiber," IEEE Photon. Technol. Lett. 16, 566-568 (2004); C. Dorrer, C. R. Doerr, I. Kang, R. Ryf, J. Leuthold, and P. J. Winzer, "Measurement of eye diagrams and constellation diagrams of optical sources using linear optics and waveguide technology," J. Lightwave Technol. 23, 178-186 (2005)). Various techniques for cross-correlation have been demonstrated and are based primarily on a form of nonlinear optical gating (N. Yamada, H. Ohta, and S. Nogiwa, "Polarization-insensitive optical sampling system using two KTP crystals," IEEE Photon. Technol. Lett. 16, 215-217 (2004); M. Westlund, P. A. Andrekson, H. Sunnerud, J. Hansryd, and J. Li, "High-performance optical-fiber-nonlinearity-based optical waveform monitoring," J. Lightwave Technol. 20, 2012-2022 (2005); J. Li, M. Westlund, H. Sunnerud, B.-E. Olsson, M. Karlsson, and P. A. Andrekson, "0.5-Tb/s eye-diagram measurement by optical sampling using XPM-induced wavelength shifting in highly nonlinear fiber," IEEE Photon. Technol. Lett. 16, 566-568 (2004)). For example, nonlinear processes such as sum- and difference-frequency generation (N. Yamada, H. Ohta, and S. Nogiwa, "Polarization-insensitive optical sampling system using two KTP crystals," IEEE Photon. Technol. Lett. 16, 215-217 (2004)), four-wave mixing (FWM) (M. Westlund, P. A. Andrekson, H. Sunnerud, J. Hansryd, and J. Li, "High-performance optical-fiber-nonlinearity-based optical waveform monitoring," J. Lightwave Technol. 20, 2012-2022 (2005)), and cross-phase modulation (J. Li, M. Westlund, H. Sunnerud, B.-E. Olsson, M. Karlsson, and P. A. Andrekson, "0.5-Tb/s eye-diagram measurement by optical sampling using XPM-induced wavelength shifting in highly nonlinear fiber," IEEE Photon. Technol. Lett. 16, 566-568 (2004)) have been used for sampling communication signals at data rates as high as 500 Gb/s. Cross-correlation based on coherent linear detection has also been studied (C. Dorrer, C. R. Doerr, I. Kang, R. Ryf, J. Leuthold, and P. J. Winzer, "Measurement of eye diagrams and constellation diagrams of optical sources using linear optics and waveguide technology," J. Lightwave Technol. 23, 178-186 (2005)) and is architecturally similar to these nonlinear techniques. While such systems can achieve sub-picosecond sampling resolution, the sample points are far apart in time since they are determined by the sampling pulse period (longer than a nanosecond). As a result, the samples must be post-processed in order to reconstruct a repetitive waveform or the eye diagram corresponding to a digital data stream. Optical packets and non-repetitive optical waveforms cannot be characterized using these sampling techniques, and rapid fluctuations in the signal are difficult to monitor and characterize because each pump pulse arrival generates only a single point in the sampled waveform.

Several solutions have been proposed that are capable of characterizing arbitrary waveforms in a single shot. One solution is time-to-space conversion, which allows temporal sampling using an array of detectors (J.-H. Chung and A. M. Weiner, "Real-time detection of femtosecond optical pulse sequences via time-to-space conversion in the lightwave communications band," J. Lightwave Technol. 21, 3323-3333 (2003); Y. Takagi, Y. Yamada, K. Ishikawa, S. Shimizu, and S. Sakabe, "Ultrafast single-shot optical oscilloscope based on time-to-space conversion due to temporal and spatial walk-off effects in nonlinear mixing crystal," Jpn. J. Appl. Phys. 44, 6546-6549 (2005); P. C. Sun, Y. T. Mazurenko, and Y. Fainman, "Femtosecond pulse imaging: ultrafast optical oscilloscope," J. Opt. Soc. Am. A 14, 1159-1170 (1997); M. A. Foster, R. Salem, D. F. Geraghty, A. C. Turner-Foster, M. Lipson, and A. L. Gaeta, "Silicon-chip-based ultrafast optical oscilloscope," Nature 456, 81-84 (2008)). However, most of the demonstrated systems based on this approach have limited waveform record length, and it is difficult to achieve fast detector read-out rates, which makes them unsuitable for monitoring rapidly varying signals.

Another solution is based on creating several replicas of the pump signal (C. Dorrer, J. Bromage, and J. D. Zuegel, "High-dymanic-range single-shot cross-correlator based on an optical pulse replicator," Opt. Express 16, 13534-13544 (2008)) or the input waveform (K.-L. Deng, R. J. Runser, I. Glesk, and P. R. Prucnal, "Single-shot optical sampling oscilloscope for ultrafast optical waveforms," IEEE Photon. Technol. Lett., 10, 397-399 (1998)) in order to perform single-shot sampling. However, the sensitivity is limited by the number of the created replicas, which leads to a trade-off between sensitivity and the number of samples.

There is therefore a need in the art for ultrafast systems and methods for optical waveform sampling with sub-picosecond resolution, and with record lengths longer than 100 ps. There is also a need in the art for ultrafast optical waveform sampling that can be applied to non-repetitive signals, short optical packets, and single events. There is also a need in the art for an optical waveform sampling system that can be used to convert a low-speed sampling device into an ultrafast sampling system.

In another embodiment, the temporal stretching system provides single-shot sampling, which allows characterizing short optical packets and one-time optical events, and monitoring fast variations of the optical signal.

Citation or identification of any reference in Section 2, or in any other section of this application, shall not be considered an admission that such reference is available as prior art to the present invention.

3. SUMMARY OF THE INVENTION

A temporal stretching device for stretching a signal waveform is provided comprising:
  an input dispersive (or "dispersion") element for dispersing an input signal waveform;
  a pump pulse source;
  a pump pulse dispersive element for dispersing (or "chirping") a pump pulse produced by the pump source;
  an optical coupler for combining the pump pulse and the dispersed input signal waveform;
  a four-wave mixer (FWM), wherein the four-wave mixer is coupled to the optical coupler;
  a band-pass filter; and
  an output dispersive element.

In one embodiment, the temporal stretching device comprises an optical detector.

In another embodiment, the optical detector is a real-time oscilloscope or a sampling oscilloscope.

In another embodiment, the pump pulse source is an OPO or short-pulse laser.

The input dispersive element, the pump pulse dispersive element and/or the output dispersive element can be any suitable dispersive element known in the art. In one embodiment, the input dispersive element, the pump pulse dispersive element and/or the output dispersive element is a grating, an optical fiber, a chirped Bragg grating, or a dispersion waveguide.

The four-wave mixer (FW) can be any FWM device known in the art, e.g., a silicon chip-based waveguide, a photonic crystal fiber, a highly nonlinear fiber, a semi-conductor optical amplifier, or a dielectric nonlinear waveguide.

In another embodiment, the four-wave mixer (FWM) is a silicon chip-based waveguide (or FWM device) and the band-pass filter is integrated on the FWM chip.

In another embodiment, the ratio of the total dispersion on the pump path and the total dispersion on the signal path is 2:1.

In another embodiment, the stretching factor is given by the ratio between the dispersion of the output dispersive element and the dispersion of the input signal waveform.

In another embodiment, the input dispersive element is coupled to (i.e., coupled to) the pump pulse source and the optical coupler.

In another embodiment, the pump pulse dispersive element is coupled to a signal source (or transmitter) and the optical coupler.

In another embodiment, the four-wave mixer is coupled to the optical coupler and the output dispersive element.

In another embodiment, the band-pass filter is coupled to the four-wave mixer and the third dispersive element.

In another embodiment, the band-pass filter is coupled to the output dispersive element and the optical detector.

In another embodiment, the optical detector is coupled to the output dispersive element.

In another embodiment, the dispersion slope of the input signal and the pump paths are small such that the third-order dispersion length associated with the desired temporal resolution is at least 10 times longer than the physical length of these dispersive paths (the actual factor can depend on the distortion tolerance). As will be recognized by the skilled artisan, if T is the desired temporal resolution and $\beta_3$ is the dispersion slope, the third-order dispersion length for a pulse with the same width as the desired resolution is defined as $L'_D=T^3/\beta_3$.

In another embodiment, the output dispersion is large enough for the time-to-frequency conversion to occur after the time lens. i.e., the dispersion length of the signal after the time lens is much shorter than the physical length of the dispersive path at the output.

In another embodiment, the magnification factor (which is the ratio between input and output dispersion) is in the range of 10-100, 100-1000 or 1000-10,000.

In another embodiment, the input dispersive element and/or the pump pulse dispersive element is a fiber with a small dispersion slope and the output dispersive element is a fiber with more (or greater) dispersion than the input dispersive element and/or the pump pulse dispersive element.

In another embodiment, the stretching factor of the signal waveform is at least 100×, at least 200×, at least 300×, at least 400×, or at least 500×.

In another embodiment, a temporal stretching device for stretching a signal waveform is provided comprising:

an input dispersive element for dispersing an input signal waveform coupled to an input signal waveform source;

a pump pulse source;

a pump pulse dispersive element for dispersing a pump pulse coupled to the pump pulse source;

an optical coupler for combining the pump pulse and the input signal waveform;

a four-wave mixer coupled to the output of the optical coupler;

a band-pass filter coupled to the output of the four-wave mixer;

an output dispersive element coupled to the output of the band-pass filter; and an optical detector coupled to the output of the output dispersive element.

In one embodiment, the input dispersive element, the pump pulse dispersive element, and/or the output dispersive element is a fiber.

In another embodiment, the optical detector is a real-time oscilloscope coupled to the output of the third dispersive element.

In another embodiment, the dispersion slope of the input signal path and the pump path are small such that the third-order dispersion length associated with desired temporal resolution is at least 10 times longer than the physical length of the input signal path and the pump path.

In another embodiment, the output dispersive element is coupled to the output of the four-wave mixer, the band-pass filter is coupled to the output of the output dispersive element fiber, and the real-time oscilloscope is coupled to the output of the band-pass filter.

A method for sampling an optical signal is provided comprising the steps of:

obtaining (or providing) an input signal waveform to be sampled;

stretching the input signal waveform to slow the input signal down in time; and detecting the slowed-down signal with an optical detector.

In one embodiment, the step of stretching the input signal waveform comprises:

applying a chirp to the input signal waveform; and dispersing the chirped signal waveform in a dispersive element.

In another embodiment, the step of applying chirp to the input signal waveform comprises the steps of dispersing a pump pulse and combining the dispersed pump pulse with the dispersed signal waveform.

A method for sampling an optical signal is also provided comprising the steps of:

obtaining (or providing) an input signal waveform to be sampled;

dispersing the input signal waveform in an input dispersive element;

providing a pump pulse;

dispersing the pump pulse in a pump pulse dispersive element wherein the ratio of the dispersion of the pump to the dispersion of the input signal waveform is 2:1;

combining the dispersed pump pulse and dispersed signal waveform in an optical coupler;

applying four-wave mixing to the combined pump pulse and dispersed signal waveform in a four-wave mixer;

filtering the output of the four-wave mixer using a band-pass filter;

dispersing the output of the four-wave mixer in an output dispersive element; and detecting the output with an optical detector.

In one embodiment, the step of filtering the output of the four-wave mixer using the band-pass filter is conducted before the step of dispersing the output of the four-wave mixer using the dispersive element.

In another embodiment, the step of filtering the output of the four-wave mixer using the band-pass filter is conducted after the step of dispersing the output of the four-wave mixer using the dispersive element.

In another embodiment, the method comprises providing a silicon waveguide for coupling into the four-wave mixer.

In another embodiment, the optical detector is a real-time oscilloscope or a sampling oscilloscope.

In another embodiment, the pump pulse source is an OPO or short-pulse laser.

In another embodiment, the input dispersive element, the pump pulse dispersive element and/or the output dispersive element is a grating, an optical fiber, a chirped Bragg grating, or a dispersion waveguide.

The four-wave mixer (FWM) can be any suitable FWM device known in the art. In one embodiment, the four-wave mixer (FWM) is a silicon chip-based waveguide (or FWM device), a photonic crystal fiber, a highly nonlinear fiber, a semi-conductor optical amplifier, or a dielectric nonlinear waveguide.

In another embodiment, the four-wave mixer (FWM) is a silicon chip-based waveguide (or FWM device) and the band-pass filter is integrated on the FWM chip.

In another embodiment, the ratio of the total dispersion on the pump path and the total dispersion on the signal path is 2:1.

In another embodiment, the stretching factor is given by the ratio between the dispersion of the output dispersive element and the dispersion of the signal waveform.

In another embodiment, the dispersion slope of the input signal path and the pump path are small such that the third-order dispersion length associated with desired temporal resolution is at least 10 times longer than the physical length of the input signal path and the pump path.

In another embodiment, the input dispersive element and/or the pump pulse dispersive element is a fiber with a small dispersion slope and the output dispersive element is a fiber with more (or greater) dispersion than the input dispersive element and/or the pump pulse dispersive element.

In another embodiment, the signal waveform is stretched by a factor of at least 100×, 200×, 300×, 400×, or 500×.

In another embodiment, single-shot sampling of the signal waveform is produced.

4. BRIEF DESCRIPTION OF THE DRAWINGS

The present invention is described herein with reference to the accompanying drawings, in which similar reference characters denote similar elements throughout the several views. It is to be understood that in some instances, various aspects of the invention may be shown exaggerated or enlarged to facilitate an understanding of the invention.

FIG. 1. (*a*) Schematic diagram showing the concept of temporal magnification using a FWM time lens. A chirped pump pulse is mixed with the input signal, which transfers a quadratic phase to the signal. (b) Experimental setup used to demonstrate the temporal magnification concept using a silicon nanowaveguide. See Example 3 for details.

Figure 2:
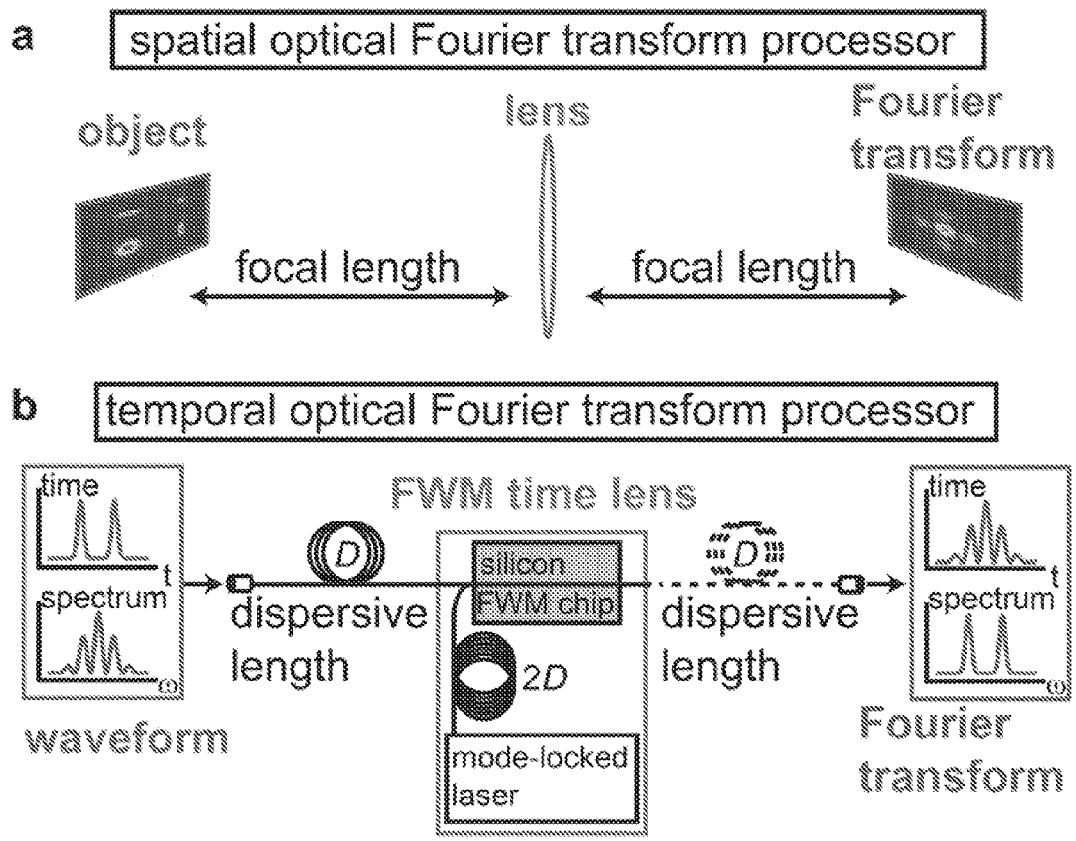

FIG. 2. The silicon-based ultrafast optical oscilloscope. An ultrafast optical oscilloscope was implemented using a four-wave mixing based parametric time-lens on a silicon chip. a, A spatial lens generated the Fourier transform of an input waveform using the two-focal-length configuration shown above. b, A time-lens in a temporal waveform Fourier transform processor converted the temporal profile of the input to the spectral profile of the output. Single-shot temporal measurements were then carried out by simply measuring the spectrum at the output of the processor. See Example 1 for details.

Figure 3:
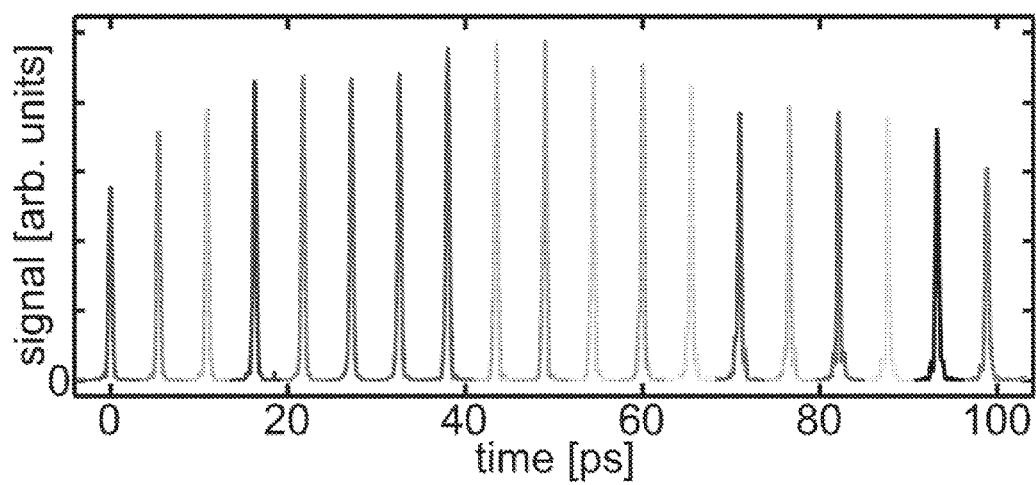

FIG. 3. Characterization of the record length and resolution of the ultrafast optical oscilloscope (UFO). A 342-fs pulse was temporally scanned and measured using the silicon-chip-based UFO demonstrating a record length of 100-ps. The average UFO-observed width of the 342-fs pulse across this scan range was 407 fs indicating a deconvolved resolution of 220 fs. See Example 1 for details.

Figure 4:
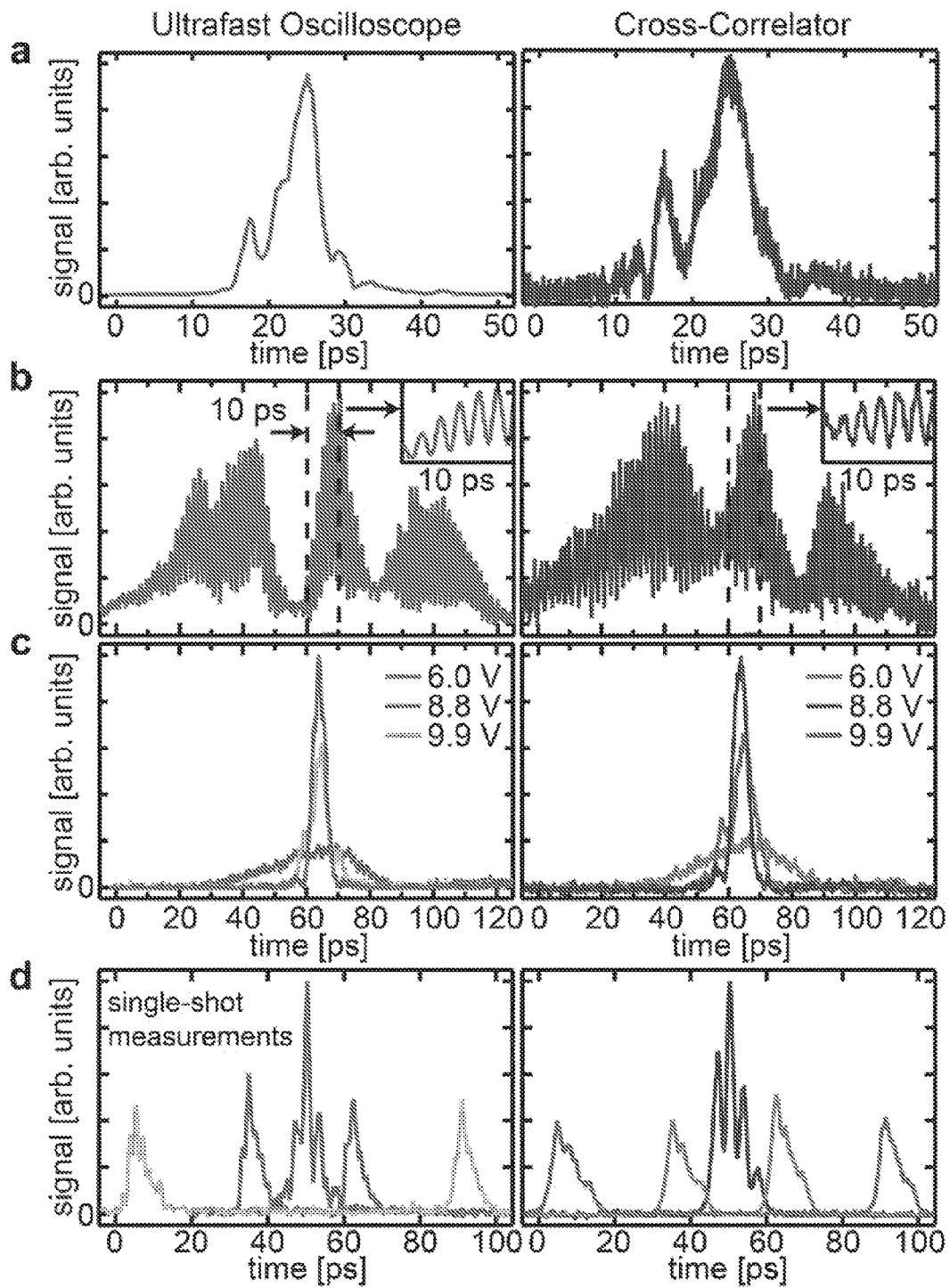

FIG. 4. Comparison of measurements using the ultrafast oscilloscope and a cross-correlator. a, 30-ps pulse generated through nonlinear spectral broadening and dispersion. b, Highly-complex waveform generated by dispersing and interfering two 300-fs pulses. The inset shows the 10-ps region from 60 ps to 70 ps. c, Measurement of a separate ultrashort-pulse laser source. The silicon-chip-based UFO was used to minimize the operating pulse width in real time by varying the voltage to an electro-optic modulator within the laser source. d, Single-shot measurements of two chirped pulses with various separations compared to a multiple-shot cross-correlation. When the pulses overlap interference fringes were observed in the time domain. See Example 1 for details.

Figure 5:
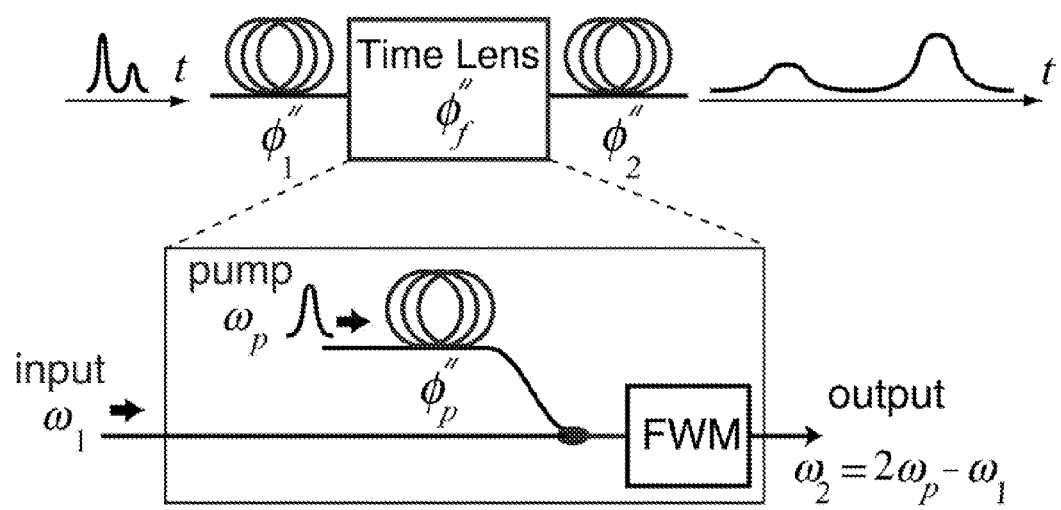

FIG. 5. The temporal imaging system and a schematic of the time lens based on FWM. See Example 2 for details.

Figure 6:
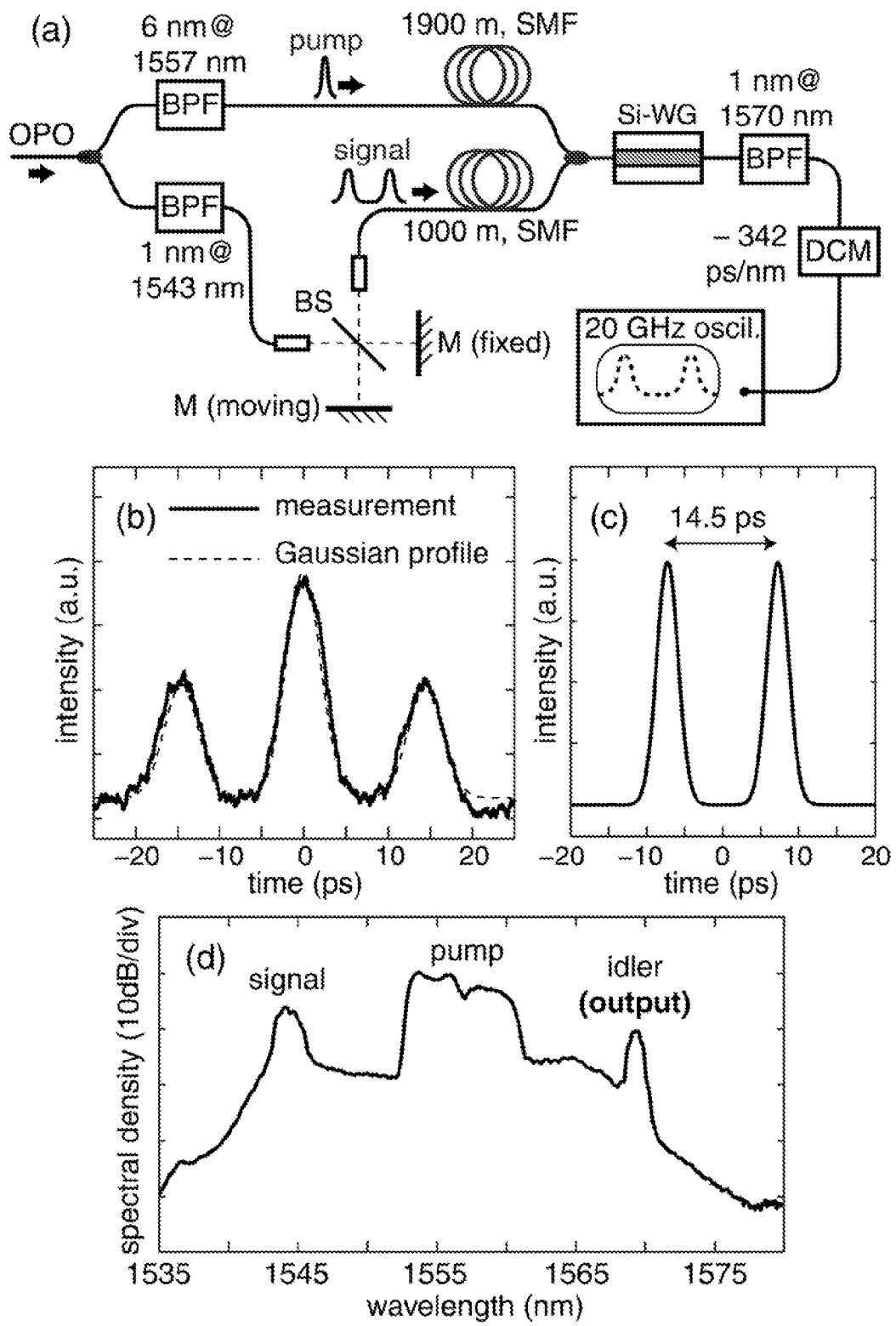

FIG. 6. (a) Experimental setup used to demonstrate FWM-based time lens. (b) Autocorrelation of the input signal, which consisted of two pulses with 3.3 ps pulse width and 14.5 ps separation. (c) Calculated input signal assuming the Gaussian pulse profile. (d) Optical spectrum at the output of the silicon waveguide. See Example 2 for details.

Figure 7:
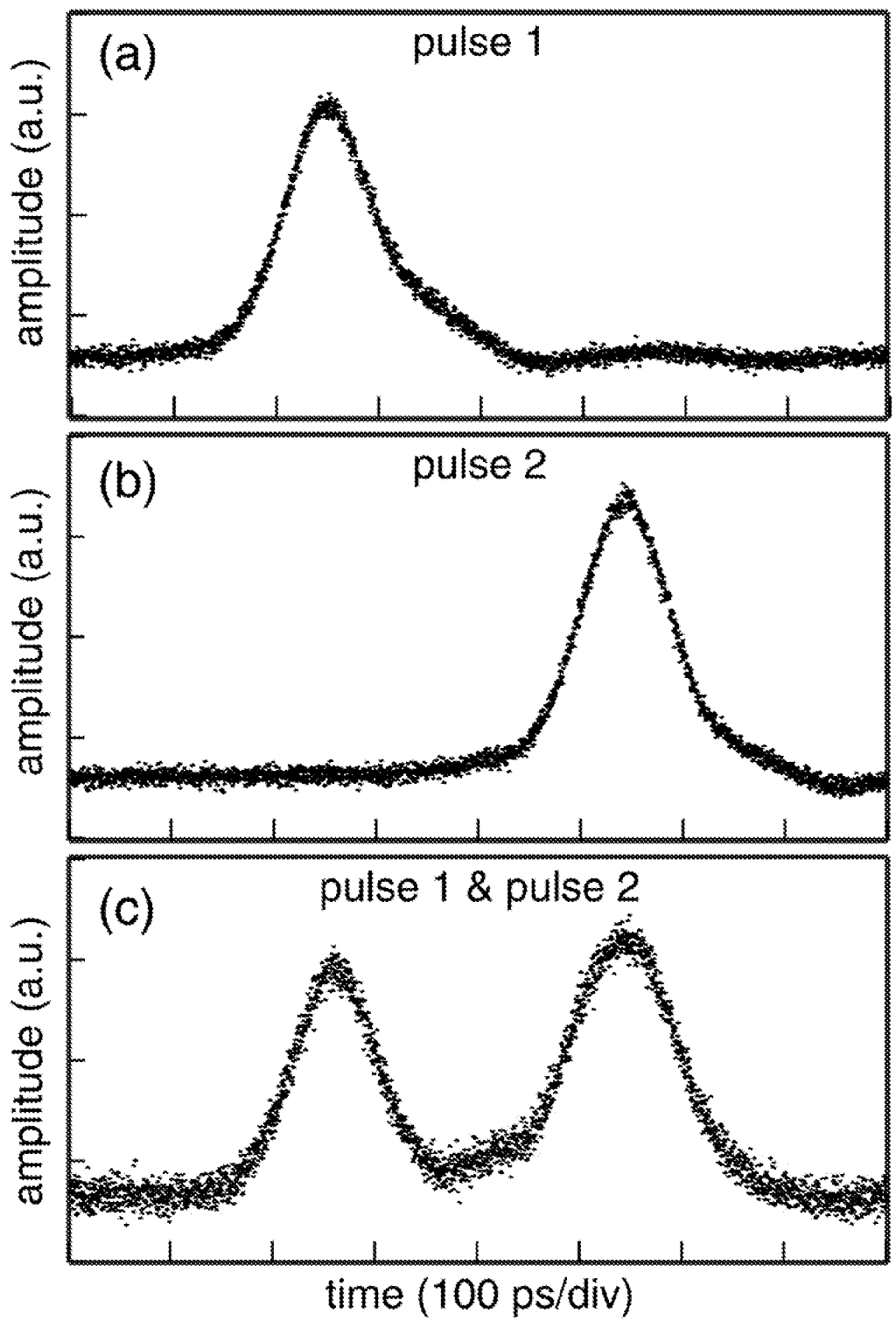

FIG. 7. Magnified signal measured using a 20 GHz detector (a) and (b) when only one of the two pulses was present and (c) when both pulses were present. See Example 2 for details.

Figure 8:
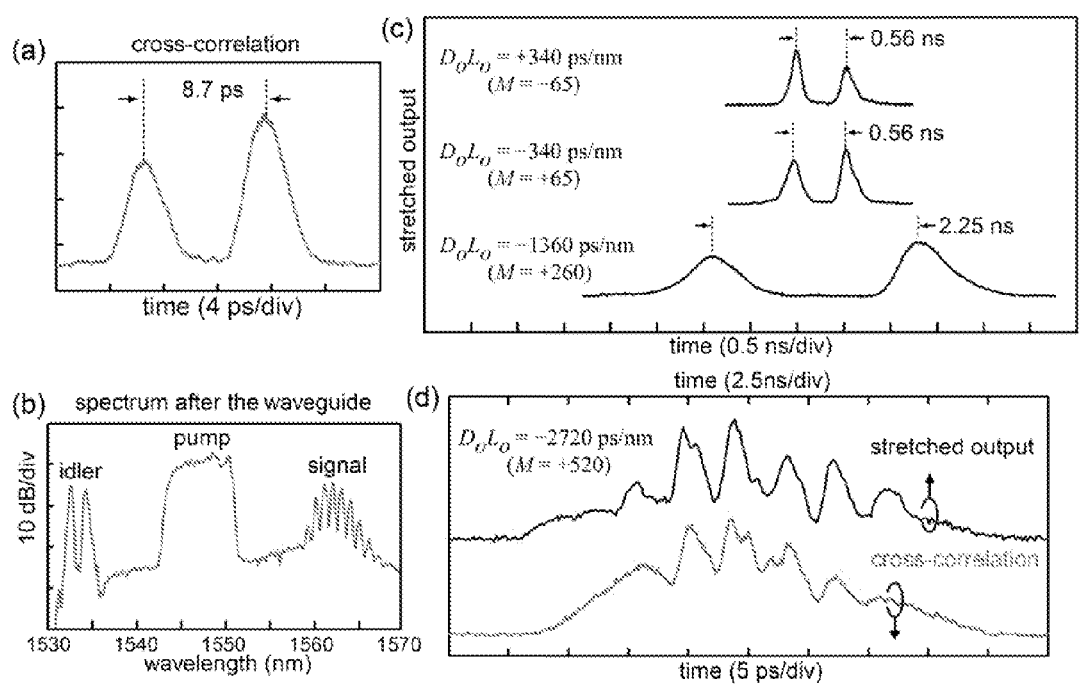

FIG. 8. (a) Cross-correlation of the first signal under test. (b) Optical spectrum measured at the output of the silicon waveguide showing an efficient wavelength conversion. The converted signal spectrum represents the input waveform in the time domain (time-to-frequency conversion). (c) Stretched signal shown for different magnification factors. (d) An arbitrary optical waveform shown before and after the temporal stretching by a factor of 520. See Example 3 for details.

Figure 9:
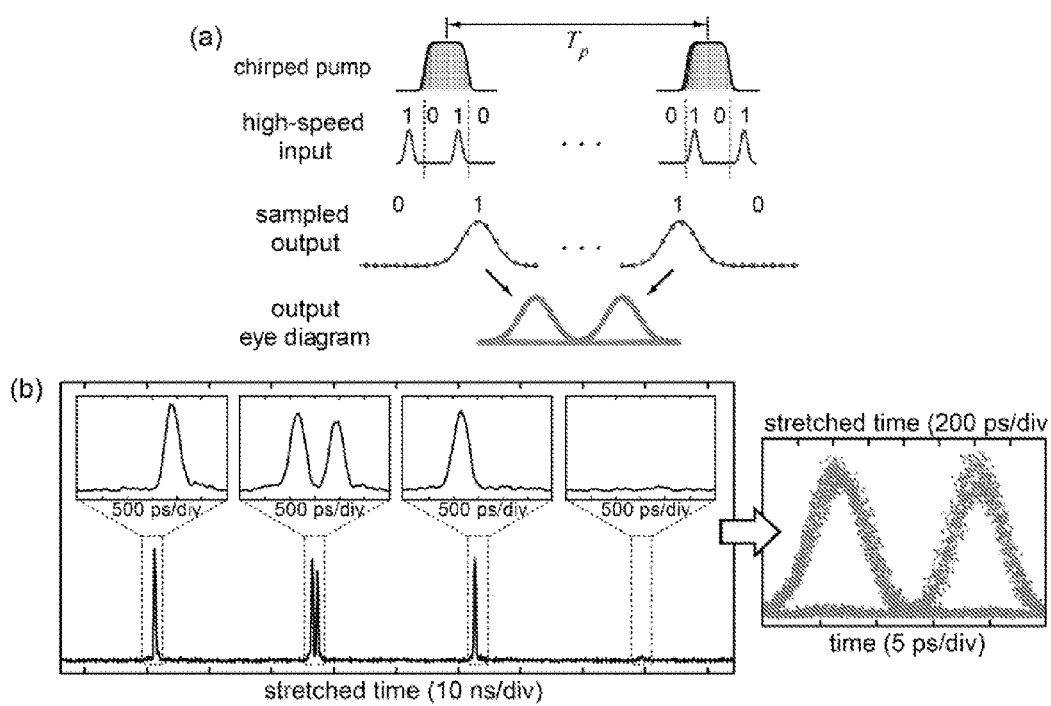

FIG. 9. (a) Schematic showing the application of the temporal (or time) stretching system and methods for characterizing randomly varying signals. (b) Single-shot measurement of an 80-Gb/s RZ signal and the corresponding eye diagram. See Example 3 for details.

Figure 10:
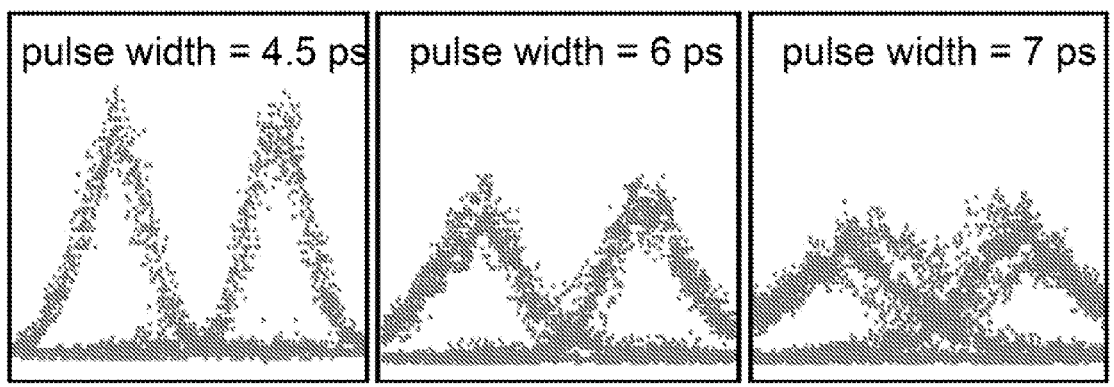

FIG. 10. Eye diagram comparison for three different pulse width settings of the transmitter showing a degraded eye diagram for longer pulse widths. See Example 3 for details.

5. DETAILED DESCRIPTION OF THE INVENTION

Systems, devices and methods for temporal stretching are provided. The temporal stretching systems (or devices) and methods can be used to directly characterize ultrafast optical signals. The systems and methods for ultrafast optical waveform sampling are based on temporal stretching of an input signal waveform. In one embodiment, temporal stretching is performed using a time-lens device, which is based on four-wave mixing in a nonlinear medium. Such suitable nonlinear media are known in the art.

In one embodiment, the temporal stretching system (or "stretching system") can comprise an input dispersive (or "dispersion") element, a time lens, and an output dispersive element. The signal is passed through the input dispersive element. The dispersed signal is sent into the time lens, which comprises a chirped pump pulse and a nonlinear medium. The chirped pump pulse is combined with the signal. The four-wave mixing process occurs in the nonlinear device or nonlinear medium, which results in the generation of a signal at a new optical frequency (idler). The idler is spectrally separated from the signal and pump pulse using a bandpass filter and sent into an output dispersive element. The output dispersive element is longer than the input dispersive element and the temporal stretching factor is given by the ratio between the dispersions of these two elements.

For clarity of disclosure, and not by way of limitation, the Detailed Description of the Invention is divided into the subsections set forth below.

5.1. Operation Principles

A method is provided for high-speed sampling wherein the input signal is stretched in time, similar to the technique used for optical sampling of electrical signals (J. Chou, O. Boyraz, B. Jalali, "Femtosecond real-time single-shot digitizer," Appl. Phys. Lett. 91, 161105 (2007); C. Dorrer, "Single-shot measurement of the electric field of optical waveforms by use of time magnification and heterodyning," Opt. Lett. 31, 540-542 (2006)).

In one embodiment, the high-speed sampling is based on temporal stretching using a FWM time lens. The concept of space-time duality is employed (M. A. Foster, R. Salem, D. F. Geraghty, A. C. Turner-Foster, M. Lipson, and A. L. Gaeta, "Silicon-chip-based ultrafast optical oscilloscope," Nature 456, 81-84 (2008); C. V. Bennett, B. D. Moran, C. Langrock, M. M. Fejer, and M. Ibsen, "640 GHz real-time recording using temporal imaging," Conference on Lasers and Electro-Optics, OSA Technical Digest CD, paper CtuA6 (2008)), which relies upon the equivalence between the diffractive propagation of a spatial field and the dispersive propagation of a temporal waveform. Much like a spatial lens can magnify a spatial pattern, a temporal lens can magnify a signal in time (C. V. Bennett and B. H. Kolner, "Principles of parametric temporal imaging—Part I: System configurations," IEEE J. Quantum Electron. 36, 430-437 (2000); C. V. Bennett, R. P. Scott, and B. H. Kolner, "Temporal magnification and reversal of 100 Gb/s optical data with an upconversion time microscope," Appl. Phys. Lett. 65, 2513-2515 (1994); C. V. Bennett, B. D. Moran, C. Langrock, M. M. Fejer, and M. Ibsen, "640 GHz real-time recording using temporal imaging," Conference on Lasers and Electro-Optics, OSA Technical Digest CD, paper CtuA6 (2008); R. Salem, M. A. Foster, A. C. Turner, D. F. Geraghty, M. Lipson, and A. L. Gaeta, "Optical time lens based on four-wave mixing on a silicon chip," Opt. Lett. 33, 1047-1049 (2008)).

The function of the lens in the time domain is to impart a quadratic phase shift on the input signal. Although the current, art-known approach would be to use an electro-optic phase modulator, the maximum phase shift that can be imparted on the signal is limited, which restricts its use for ultrafast signal processing (M. T. Kauffman, W. C. Banyal, A. A. Godil, and D. M. Bloom, D. M. "Time-to-frequency converter for measuring picosecond optical pulses," Appl. Phys. Lett. 64, 270-272 (1994); J. van Howe and C. Xu, "Ultrafast optical signal processing based upon space-time dualities," J. Lightwave Technol. 24, 2649-2662 (2006); C. V. Bennett and B. H. Kolner, "Principles of parametric temporal imaging—Part I: System configurations," IEEE J. Quantum Electron. 36, 430-437 (2000)).

In one embodiment, a time lens can be used that produces more than 10 times the maximum phase shift as compared to an electrically-driven phase modulator is based on utilizing a parametric nonlinear optical process such as sum- or difference-frequency generation with a chirped pump pulse (C. V. Bennett and B. H. Kolner, "Principles of parametric temporal imaging—Part I: System configurations," IEEE J. Quantum Electron. 36, 430-437 (2000); C. V. Bennett, R. P. Scott, and B. H. Kolner, "Temporal magnification and reversal of 100 Gb/s optical data with an upconversion time microscope," Appl. Phys. Lett. 65, 2513-2515 (1994); C. V. Bennett, B. D. Moran, C. Langrock, M. M. Fejer, and M. Ibsen, "640 GHz real-time recording using temporal imaging," Conference on Lasers and Electro-Optics, OSA Technical Digest CD, paper CtuA6 (2008)). The quadratic phase of the chirped pump pulse is transferred to the input signal through the nonlinear wave mixing process. Temporal imaging schemes are known in the art using this approach (C. V. Bennett and B. H. Kolner, "Principles of parametric temporal imaging—Part I: System configurations," IEEE J. Quantum Electron. 36, 430-437 (2000); C. V. Bennett, R. P. Scott, and B. H. Kolner, "Temporal magnification and reversal of 100 Gb/s optical data with an upconversion time microscope," Appl. Phys. Lett. 65, 2513-2515 (1994); C. V. Bennett, B. D. Moran, C. Langrock, M. M. Fejer, and M. Ibsen, "640 GHz real-time recording using temporal imaging," Conference on Lasers and Electro-Optics, OSA Technical Digest CD, paper CtuA6 (2008)).

FWM in a silicon waveguide or in another material utilizing the $\chi^{(3)}$, can also be used to realize a parametric time lens (Examples 1 and 2, see also M. A. Foster, R. Salem, D. F. Geraghty, A. C. Turner-Foster, M. Lipson, and A. L. Gaeta, "Silicon-chip-based ultrafast optical oscilloscope," Nature 456, 81-84, 2008; R. Salem, M. A. Foster, A. C. Turner, D. F. Geraghty, M. Lipson, and A. L. Gaeta, "Optical time lens based on four-wave mixing on a silicon chip," Opt. Lett. 33, 1047-1049, 2008). Unlike the sum- and difference-frequency generation, the input and output signals can be close to each other in frequency.

5.2 Temporal Stretching Systems

Systems (i.e., devices) and methods are provided for ultrafast optical waveform sampling, which are based on temporal stretching of the signal. Temporal stretching is performed using a time-lens device, which is based on four-wave mixing in a nonlinear medium.

In one embodiment, the stretching system can comprise an input dispersive element, a time lens, and an output dispersive element. The signal is first passed through the input dispersive element. The dispersed signal is sent into the time lens which comprises a chirped pump pulse and a nonlinear medium. The chirped pump pulse is combined with the signal, and the four-wave mixing process occurs in the nonlinear device, which results in the generation of a signal at a new optical frequency (idler). The idler is then spectrally separated from the signal and pump pulse using a bandpass filter and is sent into the output dispersive element. The output dispersive element has more total dispersion than the input dispersive element and the temporal stretching factor is given by the ratio between the dispersions of these two elements A temporal stretching device for stretching a signal waveform is also provided comprising:

an input dispersive (or "dispersion") element for dispersing an input signal waveform;

a pump pulse source;

a pump pulse dispersive element for dispersing (or "chirping") a pump pulse produced by the pump source;

an optical coupler for combining the pump pulse and the dispersed input signal waveform;

a four-wave mixer (FWM), wherein the four-wave mixer is coupled to the optical coupler;

a band-pass filter; and an output dispersive element.

In one embodiment, the temporal stretching device comprises an optical detector.

In another embodiment, the optical detector is a real-time oscilloscope or a sampling oscilloscope.

In another embodiment, the pump pulse source is an OPO or short-pulse laser.

The input dispersive element, the pump pulse dispersive element and/or the output dispersive element can be any suitable dispersive element known in the art. In one embodiment, the input dispersive element, the pump pulse dispersive element and/or the output dispersive element is a grating, an optical fiber, a Bragg grating (e.g., a chirped Bragg grating), a grating, a prism, or a dispersion waveguide.

The four-wave mixer (FW) can be any FWM device known in the art, e.g., a silicon chip-based waveguide, a semiconductor waveguide, a photonic crystal fiber, an optical fiber, a highly nonlinear fiber, a semi-conductor optical amplifier, or a dielectric nonlinear waveguide.

In another embodiment, the four-wave mixer (FWM) is a silicon chip-based waveguide (or FWM device) and the band-pass filter is integrated on the FWM chip.

In another embodiment, the ratio of the total dispersion on the pump path and the total dispersion on the signal path is 2:1.

In another embodiment, the stretching factor is given by the ratio between the dispersion of the output dispersive element and the dispersion of the input signal waveform.

In another embodiment, the input dispersive element is coupled (or functionally connected) to the pump pulse source and the optical coupler.

In another embodiment, the pump pulse dispersive element is coupled to a signal source (or transmitter) and the optical coupler.

In another embodiment, the four-wave mixer is coupled to the optical coupler and the output dispersive element.

In another embodiment, the band-pass filter is coupled to the four-wave mixer and the third dispersive element.

In another embodiment, the band-pass filter is coupled to the output dispersive element and the optical detector.

In another embodiment, the optical detector is coupled to the output dispersive element.

In another embodiment, the dispersion slope of the input signal and the pump paths are small such that the third-order dispersion length associated with the desired temporal resolution is at least 10 times longer than the physical length of these dispersive paths (the actual factor can depend on the distortion tolerance). As will be recognized by the skilled artisan, if T is the desired temporal resolution and $\beta_3$ is the dispersion slope, the third-order dispersion length for a pulse with the same width as the desired resolution is defined as $L'_D = T^3/\beta_3$.

In another embodiment, the output dispersion is large enough for the time-to-frequency conversion to occur after the time lens. i.e., the dispersion length of the signal after the time lens is much shorter than the physical length of the dispersive path at the output.

In another embodiment, the magnification factor (which is the ratio between input and output dispersion) is in the range of 10-100, 100-1000 or 1000-10,000.

In another embodiment, the input dispersive element and/or the pump pulse dispersive element is a fiber with a small dispersion slope and the output dispersive element is a fiber with more (or greater) dispersion than the input dispersive element and/or the pump pulse dispersive element.

In another embodiment, the stretching factor of the signal waveform is at least 100×, at least 200×, at least 300×, at least 400×, or at least 500×.

In another embodiment, a temporal stretching device for stretching a signal waveform is provided comprising:
an input dispersive element for dispersing an input signal waveform coupled to an input signal waveform source;
a pump pulse source;
a pump pulse dispersive element for dispersing a pump pulse coupled to the pump pulse source;
an optical coupler for combining the pump pulse and the input signal waveform;
a four-wave mixer coupled to the output of the optical coupler;
a band-pass filter coupled to the output of the four-wave mixer;
an output dispersive element coupled to the output of the band-pass filter; and
an optical detector coupled to the output of the output dispersive element.

In one embodiment, the input dispersive element, the pump pulse dispersive element, and/or the output dispersive element is a fiber.

In another embodiment, the optical detector is a real-time oscilloscope coupled to the output of the third dispersive element.

In another embodiment, the dispersion slope of the input signal path and the pump path are small such that the third-order dispersion length associated with desired temporal resolution is at least 10 times longer than the physical length of the input signal path and the pump path.

In another embodiment, the output dispersive element is coupled to the output of the four-wave mixer, the band-pass filter is coupled to the output of the output dispersive element fiber, and the real-time oscilloscope is coupled to the output of the band-pass filter.

In another embodiment, the temporal stretching system has all fiber and waveguide geometry (fully guided) and can be packaged in a compact and robust system.

In another embodiment, the system directly displays the optical waveform (no retrieval algorithm).

FIG. 1(a) shows one embodiment of the temporal stretching system, comprising an input dispersive element, a time lens, and an output dispersive element. The time lens comprises a pump pulse that is chirped by passing through a dispersive element and a silicon nanowaveguide that transfers the linear chirp of the pump pulse to the dispersed input signal via FWM. In a manner similar to the way that a spatial imaging system magnifies spatial patterns, the input signal is magnified in time and the magnification factor is given by $M = _{DoLo}/_{DiLi}$, where $_{DiLi}$ and $_{DoLo}$ are the total dispersion of the input and output dispersive elements, respectively.

For large stretching factors the total input dispersion ($_{DiLi}$) is preferably approximately half of the dispersion used for chirping the pump pulse ($_{DpLp}$), which corresponds to the temporal focal length of the time lens (see Examples 1 and 2). Similar to a spatial Fourier analyzer, the spectrum of the signal after the time lens represents the temporal input waveform with the time-to-wavelength conversion factor given by $\Delta\lambda/\Delta t = (_{DiLi})^{-1}$. Analogous to Fraunhofer diffraction, the large dispersive element after the time lens converts the signal from the frequency domain back to the time domain (J. Azana and M. A. Muriel, "Real-time optical spectrum analysis based on the time-space duality in chirped fiber gratings," IEEE J. Quantum Electron. 36, 517-526 (2000)) with wavelength-to-time conversion factor approximately given by $\Delta t'/\Delta\lambda = _{DoLo}$, which results in the temporal stretching factor $M = _{DoLo}/_{DiLi}$ between t and t'.

The nonlinear device in the system can be fabricated using methods known in the art, e.g., in a silicon nanofabrication facility using electron-beam lithography or photolithography. The nonlinear device can be fabricated using any suitable semiconductor or dielectric material (waveguide) or nonlinear glass (fiber) known in the art.

In one embodiment, the system comprises a short-pulse laser, which can be based on fibers or semiconductors and can, in certain embodiments, be integrated with the nonlinear silicon waveguide.

In another embodiment, a nanotaper is used to couple into the silicon waveguide. Such an arrangement can, in certain embodiments, improve coupling efficiency. The coupler can be made of any suitable material known in the art, e.g., silicon. In other embodiments, e.g., in which the FWM device is a fiber or dielectric waveguide, the coupler is not made of silicon but of other suitable materials known in the art.

In another embodiment, the output detection system comprises of an optical detector and an electrical sampling device. Both types of devices are commercially available and in certain embodiments, can be integrated on a silicon chip or other suitable substrate known in the art.

Dispersive elements can be based on fibers that are commercially available. Other sources of dispersion can be used that are known in the art and commercially available, e.g., fiber-Bragg gratings, prisms, gratings, etc.

In one embodiment, the time-lens is a parametric time-lens based on the third-order nonlinear process of four-wave mixing (FWM) (see Example 1). Since this device is based on the third-order Kerr nonlinearity, the FWM-based time-lens can be implemented in any material platform including the CMOS-compatible SOI photonic platform used in Example 1. The output of this time-lens is generated at a wavelength close to those of the pump and input waves enabling all the interacting waves to be in the S-, C-, and L-telecommunications bands, for example, which allows for the manipulation of all the waves using the well-established instrumentation and components available for these bands.

The flexibility of the FWM time lens and the dispersion engineering available in nanowaveguides can be used to extend the method to different wavelength regimes (e.g. visible) by using other CMOS-compatible waveguiding materials such as SiN and SiON.

In certain embodiments, the components of the temporal stretching system can be entirely integrated on-chip.

In another embodiment, the system can be synchronized with an optical clock using methods known in the art, which enables measurements of eye-diagrams by overlaying many single-shot measurements of a communications signal.

5.3 Temporal Stretching Methods

A method for sampling an optical signal is provided comprising the steps of:
  obtaining (or providing) an input signal waveform to be sampled;
  stretching the input signal waveform to slow the input signal down in time; and
  detecting the slowed-down signal with an optical detector.
In one embodiment, the step of stretching the input signal waveform comprises:
  applying a chirp to the input signal waveform; and
  dispersing the chirped signal waveform in a dispersive element.
In another embodiment, the step of applying chirp to the input signal waveform comprises the steps of dispersing a pump pulse and combining the dispersed pump pulse with the dispersed signal waveform.

A method for temporal stretching of a signal is also provided that comprises the steps of:
  passing an input signal through an input dispersive element to produce a dispersed signal;
  sending the dispersed signal into a time lens, wherein the time lens comprises a chirped pump pulse and a nonlinear medium;
  combining the chirped pump pulse with the dispersed signal, thereby producing a combined signal;
  conducting a four-wave mixing process on the combined signal in a nonlinear device and/or nonlinear medium, wherein the four-wave mixing process comprises generating a signal at a new optical frequency (hereinafter the "idler"), and
  spectrally separating the idler from the combined signal using a bandpass filter; and
  sending the combined signal to the output dispersive element.

A method for sampling an optical signal is also provided comprising the steps of:
  obtaining (or providing) an input signal waveform to be sampled;
  dispersing the input signal waveform in an input dispersive element;
  providing a pump pulse;
  dispersing the pump pulse in a pump pulse dispersive element wherein the ratio of the dispersion of the pump to the dispersion of the input signal waveform is 2:1;
  combining the dispersed pump pulse and dispersed signal waveform in an optical coupler;
  applying four-wave mixing to the combined pump pulse and dispersed signal waveform in a four-wave mixer;
  filtering the output of the four-wave mixer using a band-pass filter;
  dispersing the output of the four-wave mixer in an output dispersive element; and
  detecting the output with an optical detector.
In one embodiment, the step of filtering the output of the four-wave mixer using the band-pass filter is conducted before the step of dispersing the output of the four-wave mixer using the dispersive element.
In another embodiment, the step of filtering the output of the four-wave mixer using the band-pass filter is conducted after the step of dispersing the output of the four-wave mixer using the dispersive element.
In another embodiment, the method comprises providing a silicon waveguide for coupling into the four-wave mixer.
In another embodiment, the optical detector is a real-time oscilloscope or a sampling oscilloscope.

In another embodiment, the pump pulse source is an OPO or short-pulse laser.

In another embodiment, the input dispersive element, the pump pulse dispersive element and/or the output dispersive element is a grating, an optical fiber, a chirped Bragg grating, or a dispersion waveguide.

The four-wave mixer (FWM) can be any suitable FWM device known in the art. In one embodiment, the four-wave mixer (FWM) is a silicon chip-based waveguide (or FWM device), a photonic crystal fiber, a highly nonlinear fiber, a semi-conductor optical amplifier, or a dielectric nonlinear waveguide.

In another embodiment, the four-wave mixer (FWM) is a silicon chip-based waveguide (or FWM device) and the band-pass filter is integrated on the FWM chip.

In another embodiment, the ratio of the total dispersion on the pump path and the total dispersion on the signal path is 2:1.

In another embodiment, the stretching factor is given by the ratio between the dispersion of the output dispersive element and the dispersion of the signal waveform.

In another embodiment, the dispersion slope of the input signal path and the pump path are small such that the third-order dispersion length associated with desired temporal resolution is at least 10 times longer than the physical length of the input signal path and the pump path.

In another embodiment, the input dispersive element and/or the pump pulse dispersive element is a fiber with a small dispersion slope and the output dispersive element is a fiber with more (or greater) dispersion than the input dispersive element and/or the pump pulse dispersive element.

In another embodiment, the signal waveform is stretched by a factor of at least 100×, 200×, 300×, 400×, or 500×.

In another embodiment, single-shot sampling of the signal waveform is produced.

In one embodiment, the output dispersive element has more total dispersion than the input dispersive element. In one embodiment, the output dispersive element can be longer than the input dispersive element and the temporal stretching factor is given by the ratio between the dispersions of these two elements. In another embodiment, the output dispersive element can be the same length as (or even shorter than) the input dispersive element, but have more total dispersion than the input dispersive element. Determining total dispersion of such an element is well known in the art.

In a specific embodiment, the nonlinear device is a silicon nanowaveguide. Other nonlinear devices such as semiconductor or dielectric waveguides known in the art can also be used.

In another embodiment, the input dispersive element and/or the output dispersive element is a dispersion-compensating fiber. Other optical fibers known in the art may also be used. Other dispersive elements such as fiber Bragg gratings, prisms, and gratings may also be used.

5.4 Uses for Temporal Stretching Systems and Methods

The temporal stretching system can be used to characterize ultrafast optical signals directly. The record length can be determined by the third-order dispersion in the dispersive elements and the desired resolution. For sub-picosecond resolution, a record length longer than 100 ps can be achieved using commercially available dispersive elements.

The temporal stretching system can be used to convert a low-speed sampling device into an ultrafast sampling system.

The system can be combined with conventional sampling systems with no modification to convert them into high-speed sampling systems.

Unlike the common optical sampling systems, this approach can be applied to non-repetitive signals, short optical packets, and single events. Due to the real-time nature of the scheme, the temporal stretching system can be used to track and monitor signal fluctuations on a 10-ns time scale.

The temporal stretching system can be used for sampling of single transient phenomena (i.e., single-shot characterization), which allows characterizing short optical packets and one-time optical events, and monitoring fast variations of the optical signal.

The temporal system operates with wide operating bandwidths greater than 100 nm, allowing for sub 200-fs resolution. It has long record lengths (more than 100 ps). In certain embodiments it can be used, e.g., for performance monitoring for high-speed data and packet transmission systems or for measurement of ultrafast optical waveforms.

The methods of the invention provide tools for single-shot sampling of ultrafast optical waveforms with sub-picosecond resolution using conventional sampling devices. Single-shot waveform measurements, high-speed eye diagram analysis and performance monitoring, and large stretching factors up to 500 can be achieved.

The following examples are offered by way of illustration and not by way of limitation.

6. EXAMPLES

6.1 Example 1

Silicon-Chip-Based Ultrafast Optical Oscilloscope

Introduction

This example demonstrates the general principles configuration, design and function of a silicon-chip-based ultrafast optical oscilloscope. These general principles can be applied to the temporal stretching systems and methods, as disclosed hereinabove and in Example 3 (for high-speed optical sampling using a silicon-chip temporal magnifier).

With the realization of faster telecommunication data rates and expanding interest in ultrafast chemical and physical phenomena, simple measurements of optical waveforms with sub-picosecond resolution is increasingly important (C. Dorrer, High-speed measurements for optical telecommunication systems, IEEE J. Sel. Top. Quantum Electron. 12, 843-858 (2006)). State-of-the-art oscilloscopes with high-speed photodetectors provide single-shot waveform measurement with 30-ps resolution. While multiple-shot sampling techniques can achieve few-picosecond resolution, single-shot measurements are necessary to analyse events that are rapidly time varying, asynchronous, or may occur only once. Further improvements in single-shot resolution are challenging due to microelectronic bandwidth limitations. To overcome these limitations researchers have looked toward all-optical techniques due to the large processing bandwidths that photonics allow. This generated an explosion of interest in the integration of photonics on standard electronics platforms, which has spawned the field of silicon photonics (Jalali, B. Can silicon change photonics?, Physics Status Solid. 205, 213-224 (2008) and promises to enable the next generation of computer processing units and advance high-bandwidth communications. For the success of silicon photonics in these areas, on-chip optical signal-processing for optical performance monitoring will prove critical. Beyond next generation communications, silicon-compatible ultrafast metrology would be of great utility to many fundamental research fields as evident from the scientific impact that ultrafast measurement techniques continue to make (Dudley, J. M., Finot, C., Richardson, D. J., & Millot, G., Self-similarity in ultrafast nonlinear optics. Nature Physics, 3, 597-603 (2007); Solli, D. R., Ropers, C., Koonath, P., & Jalali, B., Optical rogue waves. Nature, 450, 1054-1057 (2007); Solli, D. R., Chou, J., & Jalali, B., Amplified wavelength-time transformation for real-time spectroscopy. Nature Photonics, 2, 48-51 (2008).

Using time-to-frequency conversion (Kauffman, M. T., Banyal, W. C., Godil, A. A., & Bloom, D. M. Time-to-frequency converter for measuring picosecond optical pulses. Appl. Phys. Lett. 64, 270-272 (1994)) via the nonlinear process of four-wave mixing on a silicon chip, this example demonstrates the first waveform measurement technology for the silicon-photonic platform capable of microelectronic integration. Optical waveforms were measured with 220-fs resolution over record lengths greater than 100 ps, which represent the largest record-length-to-resolution ratio (>450) of any single-shot-capable picosecond waveform measurement technique (Kauffman, M. T., Banyal, W. C., Godil, A. A., & Bloom, D. M. Time-to-frequency converter for measuring picosecond optical pulses. Appl. Phys. Lett. 64, 270-272 (1994); Bennett, C. V., Scott, R. P., & Kolner, B. H. Temporal magnification and reversal of 100 Gb/s optical data with an upconversion time microscope. Appl. Phys. Lett. 65, 2513-2515 (1994); Bennett, C. V., & Kolner, B. H. Upconversion time microscope demonstrating 103× magnification of femtosecond waveforms. Opt. Lett. 24, 783-785 (1999); Mouradian, L. K., Louradour, F., Messager, V., Barthelemy, A., & Froehly, C. Spectro-temporal imaging of femtosecond events. IEEE J. Quantum Electron. 36, 795-801 (2000); Azana, J., Berger, N. K., Levit, B., & Fischer, B. Spectral Fraunhofer regime: time-to-frequency conversion by the action of a single time lens on an optical pulse. Appl. Opt. 43, 483-490 (2004); Fernandez-Pousa, C. R. Temporal resolution limits of time-to-frequency transformations. Opt. Lett. 31, 3049-3051 (2006); Bennett, C. V., Moran, B. D., Langrock, C., Fejer, M. M., & Ibsen, M. 640 GHz real-time recording using temporal imaging. Conference on Lasers and Electro-Optics, OSA Technical Digest Series (CD) (Optical Society of America, 2008), paper CtuA6; Kan'an, A. M., & Weiner, A. M. Efficient time-to-space conversion of femtosecond optical pulses. J. Opt. Soc. Am. B15, 1242-1245 (1998); Oba, K., Sun, P. C., Mazurenko, Y. T., & Fainman, Y. Femtosecond Single-Shot Correlation System: A Time-Domain Approach. Appl. Opt. 38, 3810-3817 (1999); Chou, J., Boyraz, O., Jalali, B. Femtosecond real-time single-shot digitizer. Appl. Phys. Lett. 91, 161105 (2007); Bromage, J., Dorrer, C., Begishev, I. A., Usechak, N. G., & Zuegel, J. D. Highly sensitive, single-shot characterization for pulse widths from 0.4 to 85 ps using electro-optic shearing interferometry. Opt. Lett. 31, 3523-3525 (2006)). This implementation allows for single-shot measurements and solely utilizes highly-developed electronic and optical materials of complementary metal-oxide-semiconductor (CMOS) compatible silicon-on-insulator (SOI) technology and single-mode optical fibre. The mature SOI platform and the ability to integrate electronics with these CMOS-compatible photonics offer great promise to extending this technology into commonplace bench-top and chip-scale instruments.

Background

Several established nonlinear optical techniques (Kane, D. J., & Trebino, R. Single-shot measurement of the intensity and phase of an arbitrary ultrashort pulse by using frequency-resolved optical gating. Opt. Lett. 18, 823-825 (1993); Dorrer, C., de Beauvoir, B., Le Blanc, C., Ranc, S., Rousseau, J. P., Rousseau, P., Chambaret, J. P., & Salin, F. Single-shot real-time characterization of chirped-pulse amplification systems by spectral phase interferometry for direct electric-field reconstruction. Opt. Lett. 24, 1644-1646 (1999) exist to measure optical waveforms with few-femtosecond accuracy, but have limited single-shot record lengths of tens of picoseconds and limited update rates. To span the temporal region between electronic measurement and these methods and to allow for rapidly-updateable direct optical detection, techniques have been developed utilizing the space-time duality of electromagnetic waves and related phenomena (Kauffman, M. T., Banyal, W. C., Godil, A. A., & Bloom, D. M. Time-to-frequency converter for measuring picosecond optical pulses. Appl. Phys. Lett. 64, 270-272 (1994); Bennett, C. V., Scott, R. P., & Kolner, B. H. Temporal magnification and reversal of 100 Gb/s optical data with an upconversion time microscope. Appl. Phys. Lett. 65, 2513-2515 (1994); Bennett, C. V., & Kolner, B. H. Upconversion time microscope demonstrating 103× magnification of femtosecond waveforms. Opt. Lett. 24, 783-785 (1999); Mouradian, L. K., Louradour, F., Messager, V., Barthelemy, A., & Froehly, C. Spectro-temporal imaging of femtosecond events. IEEE J. Quantum Electron. 36, 795-801 (2000); Azana, J., Berger, N. K., Levit, B., & Fischer, B. Spectral Fraunhofer regime: time-to-frequency conversion by the action of a single time lens on an optical pulse. Appl. Opt. 43, 483-490 (2004); Fernandez-Pousa, C. R. Temporal resolution limits of time-to-frequency transformations. Opt. Lett. 31, 3049-3051 (2006); Bennett, C. V., Moran, B. D., Langrock, C., Fejer, M. M., & Ibsen, M. 640 GHz real-time recording using temporal imaging. Conference on Lasers and Electro-Optics, OSA Technical Digest Series (CD) (Optical Society of America, 2008), paper CtuA6); Kan'an, A. M., & Weiner, A. M. Efficient time-to-space conversion of femtosecond optical pulses. J. Opt. Soc. Am. B15, 1242-1245 (1998); Oba, K., Sun, P. C., Mazurenko, Y. T., & Fainman, Y. Femtosecond Single-Shot Correlation System: A Time-Domain Approach. Appl. Opt. 38, 3810-3817 (1999); Chou, J., Boyraz, O., Jalali, B. Femtosecond real-time single-shot digitizer. Appl. Phys. Lett. 91, 161105 (2007); Bromage, J., Dorrer, C., Begishev, I. A., Usechak, N. G., & Zuegel, J. D. Highly sensitive, single-shot characterization for pulse widths from 0.4 to 85 ps using electro-optic shearing interferometry. Opt. Lett. 31, 3523-3525 (2006)). This duality relies upon the equivalence between the paraxial wave equation, which governs diffractive propagation of a spatial field, and the scalar wave equation, which governs dispersive propagation of a temporal field (Akhmanov, S. A., Vysloukh, V. A., & Chirkin, A. S. Self-action of wave packets in a nonlinear medium and femtosecond laser pulse generation. Sov. Phys. Usp. 29, 642-677 (1986); Kolner, B. H. Space-time duality and the theory of temporal imaging. IEEE J. Quantum Electron. 30, 1951-1963 (1994)). The duality implies that spatial optical components such as a lens or prism have temporal counterparts known as a time-lens or time-prism, which can be implemented by imparting a quadratic or linear temporal phase shift, respectively, on the temporal field (Akhmanov, S. A., Vysloukh, V. A., & Chirkin, A. S. Self-action of wave packets in a nonlinear medium and femtosecond laser pulse generation. Sov. Phys. Usp. 29, 642-677 (1986); Kolner, B. H. Space-time duality and the theory of temporal imaging. IEEE J. Quantum Electron. 30, 1951-1963 (1994)). Furthermore, these components allow for temporal processing in a manner analogous to that of the spatial counterparts such as temporal-imaging of the waveform.

Two methods using the space-time duality can be applied to measure ultrafast optical waveforms. Much like a spatial lens can magnify an image, a temporal lens can lengthen an ultrafast waveform in time allowing for measurement using a photodetector and an oscilloscope that would have insufficient temporal resolution for the unmagnified waveform. This technique is known as temporal magnification (Bennett, C. V., Scott, R. P., & Kolner, B. H. Temporal magnification and reversal of 100 Gb/s optical data with an upconversion time microscope. Appl. Phys. Lett. 65, 2513-2515 (1994); Bennett, C. V., & Kolner, B. H. Upconversion time microscope demonstrating 103× magnification of femtosecond waveforms. Opt. Lett. 24, 783-785 (1999); Bennett, C. V., Moran, B. D., Langrock, C., Fejer, M. M., & Ibsen, M. 640 GHz real-time recording using temporal imaging. Conference on Lasers and Electro-Optics, OSA Technical Digest Series (CD) (Optical Society of America, 2008), paper CtuA6)). The second measurement method utilizes the Fourier property of a lens (Goodman, J. W. Introduction to Fourier Optics. (McGraw-Hill, San Francisco, 1968) that an object positioned at the front focal plane of a lens will produce a Fourier transform of the object at the back focal plane as depicted in FIG. 2a. Since the Fourier transform of a temporal waveform is its optical spectrum, extending the spatial Fourier processor to the temporal domain yields a device that converts the temporal (spectral) profile of the input to the spectral (temporal) profile of the output as depicted in FIG. 2b. Thus, a measurement of the spectrum at the Fourier plane directly yields the temporal amplitude of the incident waveform, and this process is termed time-to-frequency conversion (Kauffman, M. T., Banyal, W. C., Godil, A. A., & Bloom, D. M. Time-to-frequency converter for measuring picosecond optical pulses. Appl. Phys. Lett. 64, 270-272 (1994).

The phase shift for temporal imaging devices is typically applied using an electro-optical phase modulator, however an alternative scheme can be realized by using a parametric nonlinear wave-mixing process such as sum-frequency generation (SFG) and difference-frequency generation (DFG). This latter technique is called parametric temporal imaging (Bennett, C. V., & Kolner, B. H. Principles of parametric temporal imaging—Part I: System configurations. IEEE J. Quantum Electron. 36, 430-437 (2000)) and consists of wave-mixing with a linearly-chirped pump, yielding a converted waveform that is nearly equivalent to the signal waveform with a linear frequency chirp or equivalently a quadratic phase shift as required for a time-lens. Parametric time-lenses have phase-shifts in excess of $100\pi$, which is significantly larger than the $10\pi$ maximally possible using an electro-optical phase modulator and therefore greatly extend the applications of temporal imaging systems. A drawback of using the SFG and DFG second-order nonlinear processes is that only a narrow range of materials possess a second-order nonlinear moment, and the converted waveform is inherently generated at widely different wavelengths from that of the pump or input signal. Waveform measurement based on temporal magnification using DFG has yielded promising results including single-shot measurement of ultrafast waveforms with a resolution of less than 900 fs for a simultaneous record length of 100 ps (Bennett, C. V., Moran, B. D., Langrock, C., Fejer, M. M., & Ibsen, M. 640 GHz real-time recording using temporal imaging. Conference on Lasers and Electro-Optics, OSA Technical Digest Series (CD) (Optical Society of America, 2008), paper CtuA6)). Waveform measurement based on time-to-frequency conversion using SFG have demonstrated a resolution of 3 ps over a 31-ps record length using multiple-shot averaging (Kauffman, M. T., Banyal, W. C., Godil, A. A., & Bloom, D. M. Time-to-frequency converter for measuring picosecond optical pulses. Appl. Phys. Lett. 64, 270-272 (1994)).

This example demonstrates a parametric time-lens based on the third-order nonlinear process of four-wave mixing (FWM). This time-lens is applied to the creation of a silicon-chip-based ultrafast optical oscilloscope (UFO). Since this device is based on the third-order Kerr nonlinearity, the FWM-based time-lens can be implemented in any material platform including the CMOS-compatible SOI photonic platform used in this example. The output of this time-lens is generated at a wavelength close to those of the pump and input waves enabling all the interacting waves to be in the S-, C-, and L-telecommunications bands, for example, which allows for the manipulation of all the waves using the well-established instrumentation and components available for these bands.

Measurements of highly complex waveforms with 220-fs resolution over record lengths larger than 100 ps were performed with the device. The combination of this 220-fs resolution and greater than 100-ps record length represents the largest record length to resolution ratio (>450) of any single-shot-capable waveform measurement technique for the picosecond time range (Kauffman, M. T., Banyal, W. C., Godil, A. A., & Bloom, D. M. Time-to-frequency converter for measuring picosecond optical pulses. Appl. Phys. Lett. 64, 270-272 (1994); Bennett, C. V., Scott, R. P., & Kolner, B. H. Temporal magnification and reversal of 100 Gb/s optical data with an upconversion time microscope. Appl. Phys. Lett. 65, 2513-2515 (1994); Bennett, C. V., & Kolner, B. H. Upconversion time microscope demonstrating 103× magnification of femtosecond waveforms. Opt. Lett. 24, 783-785 (1999); Mouradian, L. K., Louradour, F., Messager, V., Barthelemy, A., & Froehly, C. Spectro-temporal imaging of femtosecond events. IEEE J. Quantum Electron. 36, 795-801 (2000); Azana, J., Berger, N. K., Levit, B., & Fischer, B. Spectral Fraunhofer regime: time-to-frequency conversion by the action of a single time lens on an optical pulse. Appl. Opt. 43, 483-490 (2004); Fernandez-Pousa, C. R. Temporal resolution limits of time-to-frequency transformations. Opt. Lett. 31, 3049-3051 (2006); Bennett, C. V., Moran, B. D., Langrock, C., Fejer, M. M., & Ibsen, M. 640 GHz real-time recording using temporal imaging. Conference on Lasers and Electro-Optics, OSA Technical Digest Series (CD) (Optical Society of America, 2008), paper CtuA6; Kan'an, A. M., & Weiner, A. M. Efficient time-to-space conversion of femtosecond optical pulses. J. Opt. Soc. Am. B15, 1242-1245 (1998); Oba, K., Sun, P. C., Mazurenko, Y. T., & Fainman, Y. Femtosecond Single-Shot Correlation System: A Time-Domain Approach. Appl. Opt. 38, 3810-3817 (1999); Chou, J., Boyraz, O., Jalali, B. Femtosecond real-time single-shot digitizer. Appl. Phys. Lett. 91, 161105 (2007); Bromage, J., Dorrer, C., Begishev, I. A., Usechak, N. G., & Zuegel, J. D. Highly sensitive, single-shot characterization for pulse widths from 0.4 to 85 ps using electro-optic shearing interferometry. Opt. Lett. 31, 3523-3525 (2006)). Furthermore, unlike commonly used techniques such as frequency-resolved optical gating (Kane, D. J., & Trebino, R. Single-shot measurement of the intensity and phase of an arbitrary ultrashort pulse by using frequency-resolved optical gating. Opt. Lett. 18, 823-825 (1993)) and spectral-phase interferometry for direct electric-field reconstruction (Bromage, J., Dorrer, C., Begishev, I. A., Usechak, N. G., & Zuegel, J. D. Highly sensitive, single-shot characterization for pulse widths from 0.4 to 85 ps using electro-optic shearing interferometry. Opt. Lett. 31, 3523-3525 (2006); Dorrer, C., de Beauvoir, B., Le Blanc, C., Ranc, S., Rousseau, J. P., Rousseau, P., Chambaret, J. P., & Salin, F. Single-shot real-time characterization of chirped-pulse amplification systems by spectral phase interferometry for direct electric-field reconstruction. Opt. Lett. 24, 1644-1646 (1999)), this implementation directly measured the temporal amplitude profile using no reconstruction algorithm allowing for rapidly updateable single-shot measurements.

The capability of the silicon-chip-based UFO was tested with various input waveforms. Each input waveform entered the UFO and passed through a dispersive element consisting of a length of optical fibre. To match to the focal length of the FWM time-lens, the input wave was mixed with a pump pulse that passes through twice the dispersive length of optical fibre. After passing through the optical fibre, the pump pulse and test waveform were combined and FWM was carried out in a SOI nanowaveguide. The strong optical confinement of these silicon structures allowed for highly efficient nonlinear processes and for engineerable group-velocity dispersion (GVD) that yielded conversion bandwidths greater than 150 nm with broad pump tunability (Dulkeith, E., Xia, F., Schares, L., Green, W. M. J., & Vlasov Y. A. Group index and group velocity dispersion in silicon-on-insulator photonic wires. Opt. Express. 14, 3853-3863 (2006); Turner, A. C., Manolatou, C., Schmidt, B. S., Lipson, M., Foster, M. A., Sharping, J. E., & Gaeta, A. L. Tailored anomalous group-velocity dispersion in silicon channel waveguides. Opt. Express 14, 4357-4362 (2006); Foster, M. A., Turner, A. C., Sharping, J. E., Schmidt, B. S., Lipson, M., & Gaeta, A. L. Broad-band optical parametric gain on a silicon photonic chip. Nature 441, 960-963 (2006); Lin, Q., Zhang, J., Fauchet, P. M., & Agrawal, G. P. Ultrabroadband parametric generation and wavelength conversion in silicon waveguides. Opt. Express 14, 4786-4799 (2006); Foster, M. A., Turner, A. C., Salem, R., Lipson, M., & Gaeta, A. L. Broad-band continuous-wave parametric wavelength conversion in silicon nanowaveguides. Opt. Express 15, 12949-12958 (2007)). The resulting FWM-generated spectrum was measured using an optical spectrometer to determine the temporal profile of the input.

The pump-pulse bandwidth and the length of the dispersive path determine the record length and resolution of the UFO. The time-to-frequency conversion factor for the FWM-based converter is given by $$\frac{\Delta t}{\Delta \omega} = -\beta_2 L, \quad (3)$$

where $\Delta t$ is the temporal shift of the input signal, $\Delta \omega$ is the resulting spectral shift, $\beta_2$ is the GVD parameter, and L is the length of the dispersive signal path. For this system, this relation yields a 1-nm shift in converted wavelength for a 5.2-ps shift in temporal position. Using FWM a narrow-band signal can be converted over twice the pump bandwidth, which yields the approximate record length $\tau_{record}$ for the FWM-based UFO, $$\tau_{record} = 2\beta_2 L \Omega_{pump}, \quad (4)$$

where $\Omega_{pump}$ is the spectral bandwidth of the pump pulse. The resolution of the UFO is predicted by considering the transfer of a temporal delta function through the UFO system. This impulse response is precisely the temporal resolution $\tau_{resolution}$ of the instrument and is given by, $$\tau_{resolution} = \frac{\tau_{pump}}{\sqrt{2}}, \qquad (5)$$

where $\tau_{pump}$ is the pump pulsewidth. For this system, these relationships predict a record length of 150 ps and a resolution of 200 fs. Practically, the separation between the pump and signal and the FWM conversion bandwidth will limit the record length. Deviation from a quadratic phase on the pump pulse, such as that resulting from TOD, the FWM conversion bandwidth, and the spectral resolution of the spectrometer will also determine the temporal resolution. Since the FWM conversion bandwidth limits both the record length and the resolution, it is important to maximize this value.

The silicon waveguides used in this implementation have sufficiently large conversion bandwidths (>150 nm) (Foster, M. A., Turner, A. C., Salem, R., Lipson, M., & Gaeta, A. L. Broad-band continuous-wave parametric wavelength conversion in silicon nanowaveguides. Opt. Express 15, 12949-12958 (2007)), to allow the UFO performance to be solely limited by the aberrations caused by third-order dispersion (TOD) and the spectrometer performance.

The record length and resolution of the system was characterized by injecting a 342-fs pulse and varying its temporal position. As shown in FIG. 3, the pulse position was measured across a record length of 100 ps. To characterize the resolution of the FWM-based UFO, the temporal resolution was deconvolved from the average observed width of this pulse across the record length of the device. An average pulse width of 407 fs was measured, which, when compared to the actual pulse width of 342 fs, indicates a temporal resolution of 220 fs for this implementation.

Measurement capabilities of the silicon-chip-based UFO were further investigated by generating test waveforms of varying complexity. First, a pulse was measured that had undergone nonlinear spectral broadening and dispersion using a UFO which exhibits 450-fs resolution and a 100-ps record length. The UFO measurement of this pulse compared to a cross-correlation is shown in FIG. 4a. An optical waveform of even greater complexity was measured by generating a 120-ps waveform with 900-fs temporal features. This waveform was measured using the silicon-chip-based UFO with 220-fs resolution. The results of this measurement and a comparison to cross-correlation are shown in FIG. 4b.

The test waveforms in FIGS. 4a,b were derived from the same laser source as the pump pulse. The UFO can also be used to perform measurements of waveforms from a separate source by synchronizing a variable-pulse-width time-lens-compressed laser source (.van Howe, J., Lee, J. H., Xu, C. Generation of 3.5 nJ femtosecond pulses from a continuous-wave laser without mode locking. Opt. Lett. 32, 1408-1410 (2007)) with a repetition rate of 9.6 GHz with the ultrafast fibre laser pump source operating at 36 MHz. Using the UFO with 220-fs resolution, the pulse-width of the 9.6-GHz source was optimized by observing it compress from a 30-ps pulse with 30-mW peak power to a 6-ps pulse with 150-mW peak power. The results of this optimisation using the UFO compared to cross-correlation are shown in FIG. 4c.

Lastly, the single-shot capability of the device was demonstrated by incorporating a single-shot spectrometer. Three single-shot optical waveforms were measured that were composed of two pulses with temporal separations of 86 ps, 27 ps, and nearly temporally overlapped. The results of these single-shot measurements compared with a multiple-shot cross-correlation are shown in FIG. 4d. As shown by the 86-ps separation, the 100-ps record length was maintained. When the pulses overlap, temporal interference fringes were observed with a 3-ps period. For this implementation, the temporal resolution was limited to 766 fs/pixel or a record length to resolution ratio of 130 by the infrared camera. High dynamic range linear arrays with more than 1000 pixels are commercially available and can allow, in certain embodiments, for utilization of the full (>450) record length to resolution ratio of the device.

The dynamic range for single-shot measurements is limited by the maximum power allowed in the silicon nanowaveguide while avoiding self-phase modulation and free-carrier generation (Foster, M. A., Turner, A. C., Salem, R., Lipson, M., & Gaeta, A. L. Broad-band continuous-wave parametric wavelength conversion in silicon nanowaveguides. Opt. Express 15, 12949-12958 (2007)) and by the minimum detectable power per pixel. These constraints can limit the range of signal peak power at the time lens from 100 µW to 100 mW, which corresponds to a dynamic range of $10^3$. The maximum power into the UFO is dependent on the feature width since a narrow temporal feature will spread during dispersive propagation before the lens and therefore the peak power at the lens is significantly lower. If resolution-limited temporal features are considered, a 40 W peak power is allowed, which corresponds to a dynamic range of $10^5$. Furthermore, since the minimum detectable power depends on the desired single-shot resolution while the maximum power does not, higher dynamic range measurements are possible in this system at reduced resolution.

In all of the measurements, good agreement was observed between the silicon-based UFO and the cross-correlation with a 280-fs pulse. Nevertheless some deviations were observed, which partially resulted from the slightly different lengths (less than 3 m variation) of optical fibre used to synchronize the arrival time of the waveforms and pump pulses to the cross-correlator as compared to the UFO. Further inconsistencies were likely due to pump pulse imperfections in the FWM time-lens. For optimal performance care must be taken to obtain a clean and flat spectral amplitude and phase for the pump pulse. Moreover, the resolution is ultimately limited by the aberrations arising from TOD in the dispersive elements. The use of dispersion-flattened fibre or dispersion-engineered waveguides (Dulkeith, E., Xia, F., Schares, L., Green, W. M. J., & Vlasov Y. A. Group index and group velocity dispersion in silicon-on-insulator photonic wires. Opt. Express. 14, 3853-3863 (2006); Turner, A. C., Manolatou, C., Schmidt, B. S., Lipson, M., Foster, M. A., Sharping, J. E., & Gaeta, A. L. Tailored anomalous group-velocity dispersion in silicon channel waveguides. Opt. Express 14, 4357-4362 (2006) in the dispersive paths can be used to alleviate this aberration and provide a path toward sub-100-fs resolution by using a sub-100-fs pump pulse.

In certain embodiments, the components of this measurement system can be entirely integrated on chip. Specifically, the integration of a pulsed laser source (Koch, B. R., Fang, A. W., Cohen, O., & Bowers, J. E. Mode-locked silicon evanescent lasers. Opt. Express 15, 11225-11233 (2007)), low-loss dispersion engineered waveguides for the dispersive paths (Dulkeith, E., Xia, F., Schares, L., Green, W. M. J., & Vlasov Y. A. Group index and group velocity dispersion in silicon-on-insulator photonic wires. Opt. Express. 14, 3853-3863 (2006); Turner, A. C., Manolatou, C., Schmidt, B. S., Lipson, M., Foster, M. A., Sharping, J. E., & Gaeta, A. L. Tailored anomalous group-velocity dispersion in silicon channel waveguides. Opt. Express 14, 4357-4362 (2006)), and an integrated single-shot spectrometer and detectors (Cheben, P., Schmid, J. H., Delage, A., Densmore, A., Janz, S., Lamontagne, B., Lapointe, J., Post, E., Waldron, P., & Xu, D.-X., A high-resolution silicon-on-insulator arrayed waveguide grating microspectrometer with submicrometer aperture waveguides. Opt. Express 15, 2299-2306 (2007)) are all areas of current research in silicon photonics. Furthermore, the flexibility of the FWM time lens and the dispersion engineering available in nanowaveguides allows for straightforward extension of this technique to different wavelength regimes (e.g. visible) by using other CMOS-compatible waveguiding materials such as SiN and SiON. Additionally, using the UFO for measuring an arbitrary repetition-rate source requires an ultrafast pump laser with repetition-rate flexibility and can be implemented, for example, using a time-lens compressed source (van Howe, J., Lee, J. H., Xu, C. Generation of 3.5 nJ femtosecond pulses from a continuous-wave laser without mode locking. Opt. Lett. 32, 1408-1410 (2007)). The single-shot capability will not only allow for measurements of single optical events but when synchronized with an optical clock, will also allow for measurements of eye-diagrams by overlaying many single-shot measurements of a communications signal.

In summary, this example demonstrates an ultrafast oscilloscope for measuring optical waveforms based on a temporal lens implemented using the nonlinear process of four-wave mixing in a silicon-on-insulator photonic chip. It also demonstrates the ability to measure highly complex waveforms, and single-shot operation of the device was experimentally verified. The FWM-based UFO uses standard optical and electronic materials, and the potential integration of the components on the CMOS-compatible photonic chip offers great promise to creating a bench-top or chip-scale device based on this technology that would facilitate studies in many branches of science where simple, ultrafast measurements of optical waveforms are required.

Methods Summary

To experimentally characterize the silicon-based UFO, the pump and input waves was generated from an ultrafast fibre laser or an optical parametric oscillator. The pulse train was spectrally separated into a 280-fs pump pulse and a signal pulse. Each input waveform entered the UFO and passed through a dispersive element consisting of a 50-m length of dispersion compensation fibre (DCF) and was mixed with a pump pulse that had been passed through 100-m length of DCF. The test waveforms in FIGS. 4a-c were created using combinations of nonlinear spectral broadening, dispersion, and interference. The 1.5-cm-long silicon nanowaveguide had a cross-sectional size of 300 nm by 750 nm, a linear propagation loss of 1.5 dB/cm, and a 3-dB coupling efficiency. For multiple-shot measurements, the FWM optical spectrum was characterized using an optical spectrum analyzer. For the single-shot demonstration, a single-shot spectrometer was implemented using a monochromator and infrared camera and a single event was created per frame.

Methods

Laser Sources

The ultrafast fibre laser used produced 80-fs pulses at a 38-MHz repetition rate. The optical parametric oscillator used produced 150-fs pulses at a 76-MHz repetition rate. The pump pulse was 280-fs pump pulse with 15-nm of bandwidth centred at 1550 nm The test waveforms for FIG. 4 were generated from a variable bandwidth signal pulse centred at 1580 nm.

Optical Fibre

A DCF (Corning model: DCM-D-080-04) was used since it has a dispersion slope that is 12× smaller than that of standard single-mode fibre (SMF) (Corning model: SMF-28). This smaller TOD reduced lens aberrations, and experimentally produced a 2× improvement in the temporal resolution as compared to an equivalent system using SMF. After passing through the DCF, the 15-nm-bandwidth pump pulse was amplified using an erbium-doped fibre amplifier (EDFA), and subsequently FWM was carried out in a CMOS-compatible embedded SOI nanowaveguide.

Test Waveforms

The test waveform in FIG. 4a was created by amplifying the signal pulse in an EDFA and inducing nonlinear spectral broadening in the amplifier. The spectrally broadened pulse was subsequently passed through a 20-m length of optical fibre. The test waveform in FIG. 4b was generated by dispersing and interfering two 300-fs pulses using 50-m of optical fibre and a Michelson interferometer. The test waveforms in FIG. 4c were generated by synchronizing a time-lens compressed laser source (van Howe, J., Lee, J. H., Xu, C. Generation of 3.5 nJ femtosecond pulses from a continuous-wave laser without mode locking. Opt. Lett. 32, 1408-1410 (2007)) with a repetition rate of 9.6 GHz with an ultrafast fibre laser pump source operating at 36 MHz. The pulse width of the 9.6-GHz source was determined by the magnitude of the electrical sine wave sent into a phase modulator used for the time-lens compressor. The test waveforms in FIG. 4d were generated by chirping a 300-fs pulse using 50-m of SMF and splitting it into two pulses using a Michelson interferometer. The separation between the pulses was then adjusted using a delay stage on the interferometer.

Silicon Waveguide

The dimensions of the silicon waveguide were chosen to maximize the conversion bandwidth by positioning a zero-GVD point in the C-telecommunications-band. The peak optical power inside the nanowaveguides was maintained below 100 mW to avoid self-phase modulation and two-photon induced free-carrier effects in the silicon (Foster, M. A., Turner, A. C., Salem, R., Lipson, M., & Gaeta, A. L. Broad-band continuous-wave parametric wavelength conversion in silicon nanowaveguides. Opt. Express 15, 12949-12958 (2007)).

Single-Shot Measurements

A single event was created per frame of the single-shot spectrometer. The 38-MHz source was down-sampled using an electro-optical modulator such that only one pulse was generated every 0.5 µs, which corresponds to the integration time of the camera and therefore a single-shot per camera image.

6.2 Example 2

Optical Time Lens Based on Four-Wave Mixing (FWM) on a Silicon Chip

This example demonstrates the general principles of configuration, design and function of an optical time lens based on four-wave mixing (FWM) on a silicon chip. These general principles can be applied to the methods and system for high-speed optical sampling using a silicon-chip temporal magnifier, as disclosed hereinabove and in Example 3.

The example demonstrates a technique to realize an optical time lens for ultrafast temporal processing that is based on four-wave mixing in a silicon nanowaveguide. The demonstrated time lens produces more than $100\pi$ of phase shift, which is not readily achievable using electro-optic phase modulators. Using this method 20× magnification of a signal consisting of two 3 ps pulses is demonstrated, which allows for temporal measurements using a detector with a 20 GHz bandwidth. The technique offers the capability of ultrafast temporal characterization and processing in a chip-scale device.

Introduction

Space-time duality has been used as a technique for high-speed temporal processing (M. T. Kauffman, W. C. Banyai, A. A. Godil, and D. M. Bloom, Appl. Phys. Lett. 64, 270 (1994); B. H. Kolner, IEEE J. Quantum Electron. 30, 1951 (1994); C. V. Bennett, R. P. Scott, and B. H. Kolner, Appl. Phys. Lett. 65, 2513 (1994); L. K. Mouradian, F. Louradour, V. Messager, A.; Barthelemy, and C. Froehly, IEEE J. Quantum Electron. 36, 795 (2000); C. V. Bennett and B. H. Kolner, IEEE J. Quantum Electron. 36, 430 (2000); J. Azaa, N. K. Berger, B. Levit, and B. Fischer, Appl. Opt. 43, 483 (2004); J. van Howe and C. Xu, J. Lightwave Technol. 24, 2649 (2006)). This duality is based on the parallel between paraxial diffraction of a beam through space and pulse propagation through a dispersive medium. Pulse compression (B. H. Kolner, Appl. Phys. Lett. 52, 1122 (1988)), time magnification (C. V. Bennett, R. P. Scott, and B. H. Kolner, Appl. Phys. Lett. 65, 2513 (1994); C. V. Bennett and B. H. Kolner, IEEE J. Quantum Electron. 36, 430 (2000)), tunable delay (J. van Howe and C. Xu, Opt. Lett. 30, 99 (2005)), and timing jitter reduction (J. van Howe and C. Xu, J. Lightwave Technol. 24, 2649 (2006)) have been demonstrated using this concept. To realize a spatial imaging system in the time domain, a temporal equivalent of the spatial lens is required. Such a device, which is often referred to as a time lens, imparts a quadratic phase to the input waveform. A simple way to realize a time lens is to modulate the phase of the optical signal using a phase modulator driven with a quadratic voltage. In practice, a modulating voltage with a sinusoidal waveform is used that provides a locally quadratic phase (M. T. Kauffman, W. C. Banyai, A. A. Godil, and D. M. Bloom, Appl. Phys. Lett. 64, 270 (1994)). Therefore, the time-window over which the lens operates with low aberration is limited to a fraction of the modulating signal period. Another difficulty with using this type of time lens arises from the fact that the driving voltage is limited by the maximum voltage tolerable by the modulator. This limits the maximum phase shift that can be imparted to the input signal.

Nonlinear optical processes can be applied to impart a quadratic phase to the input signal. For example, cross-phase modulation between a pump pulse with a quadratic temporal profile and the input signal results in adding a quadratic phase to the signal (L. K. Mouradian, F. Louradour, V. Messager, A. Barthelemy, and C. Froehly, IEEE J. Quantum Electron. 36, 795 (2000)). However, to impart large phase shifts to the input signal, high pump powers are required. In addition, the quadratic temporal shape of the pump pulse can be maintained only within a portion of the pulse duration. Another technique to realize a time lens is to use a parametric process (C. V. Bennett, B. D. Moran, C. Langrock, M. M. Fejer, and M. Ibsen, in Conference on Lasers and Electro-Optics/Quantum Electronics and Laser Science Conference and Photonic Applications Systems Technologies, OSA Technical Digest Series (CD) (Optical Society of America, 2007), paper CFF) such as sum-frequency or difference-frequency generation with chirped pump pulses. This method allows large phase shifts to be applied to the input signal, which extends the use of the temporal imaging technique to the subpicosecond regime.

The present example demonstrates that the parametric process of four-wave mixing (FWM) can be used to produce a time lens. Unlike the sum- and difference frequency generation that occur only in materials with a second-order nonlinearity, FWM occurs in any material, including silica glass and silicon. Therefore, other classes of optical devices with mature fabrication processes, including fibers and silicon insulator devices, can be used for the implementation of the FWM time lens. In addition, the converted wavelength in the FWM process is generated at nearby wavelengths, which makes it easier to detect or transmit the signal for telecommunication applications. The Kerr nonlinearity in centimeter-long silicon nanowaveguides has been successfully used to build nonlinear devices such as FWM-based wavelength converters (M. A. Foster, A. C. Turner, R. Salem, M. Lipson, and A. L. Gaeta, Opt. Express 15, 12949 (2007). R. Salem, M. A. Foster, A. C. Turner, D. F. Geraghty, M. Lipson, and A. L. Gaeta, Nat. Photonics 2, 35 (2008); Y.-H. Kuo, H. Rong, V. Sih, S. Xu, M. Paniccia, and O. Cohen, Opt. Express 14, 11721 (2006)), parametric amplifiers (M. A. Foster, A. C. Turner, J. E. Sharping, B. S. Schmidt, M. Lipson, and A. L. Gaeta, Nature 441, 960 (2006)), and signal regenerators (R. Salem, M. A. Foster, A. C. Turner, D. F. Geraghty, M. Lipson, and A. L. Gaeta, Opt. Express 15, 7802 (2007)). In the parametric time-lens scheme, the bandwidth of the conversion process determines the temporal resolution of the imaging system. It has been shown that the dispersion (A. C. Turner, C. Manolatou, B. S. Schmidt, M. Lipson, M. A. Foster, J. E. Sharping, and A. L. Gaeta, Opt. Express 14, 4357 (2006)) in silicon nanowaveguides can be controlled with high accuracy by changing the waveguide dimensions. This dispersion tailoring allows for conversion bandwidths as large as 150 nm (M. A. Foster, A. C. Turner, R. Salem, M. Lipson, and A. L. Gaeta, Opt. Express 15, 12949 (2007))), which enables the characterization of single transient phenomena or rapidly changing waveforms with femtosecond resolution.

FIG. 5 shows the concept of temporal imaging using a time lens. An ideal lens imparts a quadratic phase $\varphi_f(t)$ to the signal such that $$\varphi_f(L) = -\frac{t^2}{w\phi''_f},$$

where $\phi''_f$ is the focal group-delay dispersion (GDD) associated with the lens and is equal to the inverse of the second derivative of the phase. The dispersive elements before and after the lens are characterized by their GDD parameters $\phi''_1 = \beta_2^{(1)} L_1$ and $\phi''_2 = \beta_2^{(2)} L_2$, where $\beta_2^{(1,2)}$ and $L_{1,2}$ are the group-velocity dispersion (GVD) and the length of the dispersive elements, respectively. It has been shown that a relationship analogous to the one used for a spatial lens describes this imaging system, that is, $$\frac{1}{\phi''_1} + \frac{1}{\phi''_2} = \frac{1}{\phi''_f},$$

where the magnification is given by $M = -\phi''_2/\phi''_1$, which is analogous to that of spatial imaging.

The system used as a time lens is depicted in FIG. 5. Consider a Gaussian pump pulse propagating through a dispersive medium that is much longer than the dispersion length of the pulse. As a result, the pulse undergoes temporal broadening and is linearly chirped. The phase of the chirped pump pulse varies quadratically with time $\phi_p(t) = t^2/2\phi''_p$, where $\phi''_p = \beta_2^{(p)} L_p$, is the GDD experienced by the pump, $\beta_2^{(p)}$ is the GVD, and Lp is the length of the dispersive element. If an input signal with an electric field amplitude $E_s(t)$ is mixed with the chirped pump electric field amplitude $E_p(t)$ via the FWM process, the resulting idler electrical field is $E_i(t) \propto E_p^2(t) E_s^*(t)$, which adds a quadratic phase to the input signal. Based on Eq. (1), the time lens has a focal GDD of $\phi''_f = -\phi''_p/$ 2. The input GDD of the signal in Eq. (2) appears with the opposite sign, since the converted signal is proportional to the conjugate of the input signal.

FIG. 6(a) shows the experimental setup used for demonstrating this concept. The pump pulse and the signal under test were generated from a broadband optical parametric oscillator by spectral filtering. A 6 nm bandpass filter at a 1557 nm center wavelength yielded the pump pulse, and a 1 nm bandpass filter at 1543 nm produced the signal. The signal pulse was split into two pulses, one was delayed with respect to the other, then they were added together to produce a two-pulse signal. The measured autocorrelation of the input is plotted in FIG. 6(b), which shows two pulses with 3.3 ps pulse widths and separated by 14.5 ps. The dashed curve shows the calculated autocorrelation assuming a Gaussian profile for the pulses. The calculated input signal assuming Gaussian pulse shapes is plotted in FIG. 6(c). 1000 and 1900 m spools of standard fibers were used for the input signal and pump dispersive elements, respectively. The pump pulses were broadened from 0.6 to 200 ps, and the signal pulses were broadened from 3.3 to 18 ps. As a result, the amplitude of the chirped pump pulse was approximately constant over the time span of the chirped signal. The pump and signal peak powers were kept at sufficiently low levels that the effects of self-phase modulation were negligible. The signal and pump were then combined, amplified, and sent into a 1 cm long embedded silicon-on-insulator nanowaveguide with a cross-sectional size of 300×750 nm and a linear propagation loss of 3 dB/cm. The peak pump power inside the waveguide was kept below 200 mW to avoid substantial free-carrier effects. The FWM process between the pump and the signal generated an idler at 1570 nm, as shown in FIG. 6(d). After selecting this converted signal using a bandpass filter, it was sent into a dispersion compensation module with −342 ps/nm dispersion (Corning DCM-F-020). Using the value of the dispersion parameter for the standard single-mode fiber and the correct sign for the three GDD elements, Eq. (2) is satisfied, and the magnification coefficient is $M=-20$. The minus sign shows that the magnified signal is inverted in time with respect to the input signal. The magnified signal was then measured using a 20 GHz detector and an electrical sampling oscilloscope. FIG. 7 shows the magnified signal when one of the pulses was turned off (FIGS. 7(a) and 7(b)) and when both pulses are on (FIG. 7(c)). The separation between the pulses was 290 ps, which demonstrates the 20× magnification. The pulse width measured on the oscilloscope is longer than the desired value (66 ps) owing to the long time response of the detector. The dispersive elements in this temporal imaging system can be implemented using chirped Bragg gratings to make more compact systems with much lower latencies. Using Eq. (1) and the approximate width of the pump pulse after the dispersive element (200 ps), the total phase shift applicable using this time lens was estimated to be more than $100\pi$, which is not readily achievable using electro-optic phase modulators.

In summary, this example demonstrates a time lens based on FWM in a silicon nanowaveguide. The time lens can be used for temporal processing of ultrafast optical signals, and advantages of the new technique include broad conversion bandwidth, leading to enhanced time resolution and its potential for integration in a chip-scale device.

6.3 Example 3

High-Speed Optical Sampling Using a Silicon-Chip Temporal Magnifier

This example demonstrates the utility of a FWM-based time lens for temporal stretching of high-speed signals by factors as large as 520, such that the sampling can be performed using low-speed electronic devices. It also demonstrates single-shot sampling at sampling rates exceeding 1 TS/s and performance monitoring at 80 Gb/s as two important applications of this device. The read-out rates achieved using this scheme approach nanosecond time scales, which allows for characterization of rapidly-varying signals. The implementation described in this example is a fully-guided system that utilizes a silicon nanowaveguide, based on the CMOS-compatible silicon-on-insulator technology, and commercially-available single-mode optical fibers. In addition to their robust and electronics-compatible platform with a standard fabrication process, silicon waveguide devices allow power-efficient (R. L. Espinola, J. I. Dadap, R. M. Osgood, Jr., S. J. McNab, and Y. A. Vlasov, "C-band wavelength conversion in silicon photonic wire waveguides," Opt. Express 13, 4341-4349 (2005); Y.-H. Kuo, H. Rong, V. Sih, S. Xu, and M. Paniccia, "Demonstration of wavelength conversion at 40 Gb/s data rate in silicon waveguides," Opt. Express 14, 11721-11726 (2006); M. A. Foster, A. C. Turner, J. E. Sharping, B. S. Schmidt, M. Lipson, and A. L. Gaeta, "Broad-band optical parametric gain on a silicon photonic chip," Nature 441, 960-963 (2006); M. A. Foster, A. C. Turner, R. Salem, M. Lipson, and A. L. Gaeta, "Broad-band continuous-wave parametric wavelength conversion in silicon nanowaveguides," Opt. Express 15, 12949-12958 (2007)) and broadband (M. A. Foster, A. C. Turner, J. E. Sharping, B. S. Schmidt, M. Lipson, and A. L. Gaeta, "Broad-band optical parametric gain on a silicon photonic chip," Nature 441, 960-963 (2006); M. A. Foster, A. C. Turner, R. Salem, M. Lipson, and A. L. Gaeta, "Broad-band continuous-wave parametric wavelength conversion in silicon nanowaveguides," Opt. Express 15, 12949-12958 (2007)) wavelength conversion via dispersion engineering (A. C. Turner, M. A. Foster, B. S. Schmidt, A. L. Gaeta, and M. Lipson, "Tailored anomalous group-velocity dispersion in silicon channel waveguides," Opt. Express 14, 4357-4362 (2006)), such that temporal resolutions less than 100 fs are possible.

FIG. 1(a) shows a schematic of the temporal stretching system consisting of an input dispersive element, a time lens, and an output dispersive element. The time lens is comprised of a pump pulse that is chirped by passing through a dispersive element and a silicon nanowaveguide that transfers the linear chirp of the pump pulse to the dispersed input signal via FWM. In a manner similar to the way that a spatial imaging system magnifies spatial patterns, the input signal is magnified in time and the magnification factor is given by $M=D_oL_o/D_iL_i$, where $D_iL_i$ and $D_oL_o$ are the total dispersion of the input and output dispersive elements, respectively. For large stretching factors the total input dispersion ($D_iL_i$) is preferably approximately half of the dispersion used for chirping the pump pulse ($D_pL_p$), which corresponds to the temporal focal length of the time lens (Examples 1 and 2, see also, M. A. Foster, R. Salem, D. F. Geraghty, A. C. Turner-Foster, M. Lipson, and A. L. Gaeta, "Silicon-chip-based ultrafast optical oscilloscope," Nature 456, 81-84 (2008); R. Salem, M. A. Foster, A. C. Turner, D. F. Geraghty, M. Lipson, and A. L. Gaeta, "Optical time lens based on four-wave mixing on a silicon chip," Opt. Lett. 33, 1047-1049 (2008)).

Similar to a spatial Fourier analyzer, the spectrum of the signal after the time lens represents the temporal input waveform with the time-to-wavelength conversion factor given by $\Delta\lambda/\Delta t=(D_iL_i)^{-1}$. Analogous to Fraunhofer diffraction, the large dispersive element after the time lens converts the signal from the frequency domain back to the time domain (J. Azana and M. A. Muriel, "Real-time optical spectrum analysis based on the time-space duality in chirped fiber gratings," IEEE J.

Quantum Electron. 36, 517-526 (2000)) with wavelength-to-time conversion factor approximately given by $\Delta t'/\Delta\lambda = D_o L_o$, which results in the temporal stretching factor $M = D_o L_o / D_i L_i$ between t and t'.

Experimental Setup

The experimental setup used for demonstrating this technique is shown in FIG. 1(b). A passively mode-locked fiber laser with 38-MHz repetition rate and 7-nm bandwidth was used as the pump source and was followed by a length of dispersion-compensating fiber with total dispersion $D_p L_p = -10.4$ ps/nm. The input signal was sent through another length of dispersion-compensating fiber with total dispersion $D_i L_i = -5.2$ ps/nm and was combined with the chirped pump pulse. The combined pump and signal were sent into the silicon nanowire (300 nm×700 nm cross-sectional dimensions and 1.8-cm long), and the idler component generated by the FWM process was separated using a bandpass filter and sent into a dispersion-compensating module with a total dispersion equal to $D_o L_o$. The stretched signal was then detected with a 10-GHz detector and measured using a 10-GHz sampling oscilloscope. The silicon nanowaveguide was fabricated on an SOI platform using E-beam lithography, and the average linear propagation loss was 2 dB/cm. The light was coupled into the waveguide using a lensed single-mode fiber, and the waveguide output was coupled back into an optical fiber using a microscope objective lens. The coupling loss on each waveguide facet was approximately 4 dB. The dispersion compensating fiber used in the system (Corning model: DCM-D-080-04) had a dispersion parameter of D=87 ps/nm·km and a dispersion slope of S=0.025 ps/nm²·km. The ratio of the dispersion slope (S) to the dispersion parameter (D) for this fiber was 12 times smaller than that of the standard single-mode fiber, which minimized the distortions caused by the third-order dispersion.

In the first experiment, a repetitive signal was used that consisted of two 3-ps pulses separated by 8.7 ps in order to demonstrate the concept of temporal stretching. The signal and pump were generated from the same fiber laser by spectral filtering. FIG. 8(a) shows the cross-correlation of the input signal with an ultrafast pump, and FIG. 8(b) shows the spectrum at the output of the silicon waveguide. As seen in FIG. 8(b), the idler spectrum represents the signal in the time domain, which demonstrates the time-to-frequency conversion after the time lens. The stretched signal measured on a 10-GHz sampling oscilloscope is plotted in FIG. 8(c) for three different values of the output dispersion ($D_o L_o$) demonstrating both positive and negative stretching factors.

This scheme was also used for characterizing more complex waveforms such as the one shown in FIG. 8(d). The complex waveform was generated by partially overlapping two pulses (4-nm spectral width and centered at 1536 nm) in time and sending them into a 300-m spool of standard single-mode fiber. The waveform was stretched by a factor of 520 (the largest known time stretching factor demonstrated experimentally) using $D_o L_o = -2720$ ps/nm and was compared with its cross-correlation. The numerical modelling of the system for M=520 showed a 330-fs impulse response, which is in agreement with the simplified model (Example 1, see also, M. A. Foster, R. Salem, D. F. Geraghty, A. C. Turner-Foster, M. Lipson, and A. L. Gaeta, "Silicon-chip-based ultrafast optical oscilloscope," Nature 456, 81-84 (2008)) that assumes zero dispersion slope and a very large magnification factor in order to reach the Fraunhofer limit. Based on this estimated resolution and the time aperture of the measurement determined by the width of the chirped pump pulse (~70 ps), the record-length-to-resolution ratio (or the time-bandwidth product (31)) of the measurement was estimated to be 210.

This system can also be used for single-shot measurements of randomly varying waveforms. FIG. 9(a) shows how this scheme was used for sampling a randomly encoded data stream. The measurement window was determined by the width of the chirped pump pulse (~70 ps in this case), which can be adjusted by choosing the amount of dispersion on the pump path. The signal inside of this measurement window was stretched and measured using a detector and a real-time oscilloscope.

A 10-GHz pulse train was generated using a standard Mach-Zehnder pulse carver, which produced 33-ps pulses, and a time-lens compressor that compressed the pulses down to 4.5 ps. The pulse train was then modulated using a 10-Gb/s pattern generator with $2^{31}-1$ pattern length. The signal was time-interleaved with its delayed copy such that the delay between the adjacent bits was 12.5 ps simulating an 80-Gb/s RZ data stream. The signal source was synchronized to the fiber laser, which was used as the pump source. FIG. 9(b) shows a plot of the stretched signal sampled on a 5-GHz real-time oscilloscope at 20 GS/s, which demonstrates the single-shot capability of the scheme. The signal was stretched by a factor of M=65 ($D_o L_o = -340$ ps/nm), which corresponded to a 1.3-TS/s sampling rate or a 770-fs spacing between the samples. The eye diagram was generated using 380 snap-shots of the input signal (approximately 8000 samples) accumulated over a 10-μs time window and was plotted in FIG. 9(b), showing a clear open eye for the 80-Gb/s data rate. By increasing the dispersion after the time lens to $D_o L_o = -1360$ ps/nm (M=260), a 5.2 TS/s sampling rate was observed using the 5-GHz (20-GS/s) oscilloscope and a 1.3-TS/s sampling rate using a slower 1-GHz (5-GS/s) oscilloscope.

In one embodiment, the high-speed sampling systems can be used to monitor the performance of communication channels and transmitters. The utility of this scheme for monitoring the performance of the transmitter was demonstrated. Three different pulse widths (4.5 ps, 6 ps, and 7 ps) were use to see the effect of the interference between the adjacent bits. The longer pulses were generated by adjusting the time-lens compressor to produce weaker compression. The eye diagrams corresponding to these three pulse widths are plotted in FIG. 10, which shows signal degradation for longer pulses. The power sensitivity of the measurement is determined by the minimum detectable output peak power, which depends on the magnification factor. For the measurements shown in FIG. 10 in which M=62, the estimated minimum input peak power was 5 mW. This value can be lowered by increasing the FWM conversion efficiency and the waveguide coupling efficiency.

Summary

In summary, a high-speed sampling scheme was demonstrated based on temporal magnification of the signal by factors larger than 500. This approach allowed optical sampling at rates larger than 1-TS/s using a 1-GHz oscilloscope. Unlike conventional optical sampling techniques, this method allowed single-shot sampling and the measurement of short optical packets. In addition, eye diagrams were generated within a μs time-scale, which allowed monitoring MHz-rate variations in the input signal.

The present invention is not to be limited in scope by the specific embodiments described herein. Indeed, various modifications of the invention in addition to those described herein will become apparent to those skilled in the art from the foregoing description. Such modifications are intended to fall within the scope of the appended claims.

All references cited herein are incorporated herein by reference in their entirety and for all purposes to the same extent as if each individual publication, patent or patent application was specifically and individually indicated to be incorporated by reference in its entirety for all purposes.

The citation of any publication is for its disclosure prior to the filing date and should not be construed as an admission that the present invention is not entitled to antedate such publication by virtue of prior invention.

What is claimed is:

1. A temporal stretching device for stretching a signal waveform comprising:
    an input dispersive element for dispersing an input signal waveform over a signal path to produce a dispersed input signal waveform;
    a pump pulse source;
    a pump pulse dispersive element for dispersing a pump pulse produced by the pump source over a pump path to produce a dispersed pump pulse;
    an optical coupler for combining the dispersed pump pulse and the dispersed input signal waveform;
    a four-wave mixer (FWM), wherein the four-wave mixer is coupled to the optical coupler for generating a signal waveform over a frequency range different from both frequency ranges of the dispersed pump pulse and the dispersed input signal waveform;
    a band-pass filter for separating the signal waveform from the dispersed pump pulse and the dispersed input signal waveform; and
    an output dispersive element for dispersing the signal waveform, wherein the input of the output dispersive element is coupled to the output of the band-pass filter for receiving the signal waveform.

2. The device of claim 1 comprising an optical detector.

3. The device of claim 2 wherein the optical detector is a real-time oscilloscope or a sampling oscilloscope.

4. The device of claim 1 wherein the pump pulse source is an OPO or short-pulse laser.

5. The device of claim 1 wherein the input dispersive element, the pump pulse dispersive element and/or the output dispersive element is a grating, an optical fiber, a chirped Bragg grating, or a dispersion waveguide.

6. The device of claim 1 wherein the four-wave mixer (FWM) is a silicon chip-based waveguide, a photonic crystal fiber, a highly nonlinear fiber, a semi-conductor optical amplifier, or a dielectric nonlinear waveguide.

7. The device of claim 1 wherein the four-wave mixer (FWM) is a silicon chip-based waveguide, and the band-pass filter is integrated on the silicon chip-based waveguide chip.

8. The device of claim 1 wherein the ratio of a total dispersion on the pump path associated with the pump pulse dispersive element and a total dispersion on the signal path associated with the input dispersive element is 2:1.

9. The device of claim 1 wherein a stretching factor is given by the ratio between a dispersion of the output dispersive element and a dispersion of the input signal waveform.

10. The device of claim 1 wherein the input dispersive element is coupled to the pump pulse source and the optical coupler.

11. The device of claim 1 wherein the pump pulse dispersive element is coupled to a signal source (or transmitter) and the optical coupler.

12. The device of claim 1 wherein the four-wave mixer is coupled to the optical coupler and the output dispersive element.

13. The device of claim 1 wherein the band-pass filter is coupled to the four-wave mixer and the third dispersive element.

14. The device of claim 1 wherein the band-pass filter is coupled to the output dispersive element and the optical detector.

15. The device of claim 1 wherein the optical detector is coupled to the output dispersive element.

16. The device of claim 1 wherein the dispersion slope of the input signal path and the pump path are small such that a third-order dispersion length associated with a desired temporal resolution is at least 10 times longer than the physical length of these dispersive paths.

17. The device of claim 1 wherein the input dispersive element and/or the pump pulse dispersive element is a fiber with a small dispersion slope and the output dispersive element is a fiber with more dispersion than the input dispersive element and/or the pump pulse dispersive element.

18. The device of claim 1 wherein the stretching factor of the signal waveform is at least 100×, at least 200×, at least 300×, at least 400×, or at least 500×.

19. A temporal stretching device for stretching a signal waveform comprising:
    an input dispersive element for dispersing an input signal waveform coupled to an input signal waveform source over a signal path;
    a pump pulse source;
    a pump pulse dispersive element for dispersing a pump pulse coupled to the pump pulse source over a pump path;
    an optical coupler for combining the dispersed pump pulse and the dispersed input signal waveform;
    a four-wave mixer coupled to the output of the optical coupler for generating a signal waveform over a frequency range different from both frequency ranges of the dispersed pump pulse and the dispersed input signal waveform;
    a band-pass filter coupled to the output of the four-wave mixer for separating the signal waveform from the dispersed pump pulse and the dispersed input signal waveform;
    an output dispersive element for dispersing the signal waveform, wherein the input of the output dispersive element is coupled to the output of the band-pass filter for receiving the signal waveform; and
    an optical detector coupled to the output of the output dispersive element.

20. The device of claim 19 wherein the input dispersive element, the pump pulse dispersive element, and/or the output dispersive element is a fiber.

21. The device of claim 19 wherein the optical detector is a real-time oscilloscope coupled to the output of the third dispersive element.

22. The device of claim 19 wherein the dispersion slope of the input signal path and the pump path are small such that a third-order dispersion length associated with a desired temporal resolution is at least 10 times longer than the physical length of the input signal path and the pump path.

23. The device of claim 19 wherein the output dispersive element is coupled to the output of the four-wave mixer, the band-pass filter is coupled to the output of the output dispersive element fiber, and the real-time oscilloscope is coupled to the output of the band-pass filter.

24. A method for sampling an optical signal comprising the steps of:
    obtaining (or providing) an input signal waveform to be sampled;

dispersing the input signal waveform in an input dispersive element over a signal path;
providing a pump pulse;
dispersing the pump pulse in a pump pulse dispersive element over a pump path, wherein the ratio of the dispersion of the pump to the dispersion of the input signal waveform is 2:1;
combining the dispersed pump pulse and dispersed signal waveform in an optical coupler;
applying four-wave mixing to the combined pump pulse and dispersed signal waveform in a four-wave mixer to generate a signal waveform over a frequency range different from both frequency ranges of the dispersed pump pulse and the dispersed input signal waveform;
filtering the output of the four-wave mixer using a band-pass filter to separate the signal waveform from the dispersed pump pulse and the dispersed input signal waveform;
dispersing the signal waveform in an output dispersive element, wherein the input of the output dispersive element is coupled to the output of the band-pass filter for receiving the signal waveform; and
detecting the output with an optical detector.

25. The method of claim 24 wherein the step of filtering the output of the four-wave mixer using the band-pass filter is conducted before the step of dispersing the output of the four-wave mixer using the dispersive element.

26. The method of claim 24 wherein the step of filtering the output of the four-wave mixer using the band-pass filter is conducted after the step of dispersing the output of the four-wave mixer using the dispersive element.

27. The method of claim 24 comprising providing a silicon waveguide for coupling into the four-wave mixer.

28. The method of claim 24 wherein the optical detector is a real-time oscilloscope or a sampling oscilloscope.

29. The method of claim 24 wherein the pump pulse source is an OPO or short-pulse laser.

30. The method of claim 24 wherein the input dispersive element, the pump pulse dispersive element and/or the output dispersive element is a grating, an optical fiber, a chirped Bragg grating, or a dispersion waveguide.

31. The method of claim 24 wherein the four-wave mixer (FWM) is a silicon chip-based waveguide (or FWM device), a photonic crystal fiber, a highly nonlinear fiber, a semiconductor optical amplifier, or a dielectric nonlinear waveguide.

32. The method of claim 24 wherein the four-wave mixer (FWM) is a silicon chip-based waveguide, and the band-pass filter is integrated on the silicon chip-based waveguide.

33. The method of claim 24 wherein the ratio of a total dispersion on the pump path associated with the pump pulse dispersive element and a total dispersion on the signal path associated with the input dispersive element is 2:1.

34. The method of claim 24 wherein a stretching factor is given by the ratio between a dispersion of the output dispersive element and a dispersion of the signal waveform.

35. The method of claim 24 wherein the dispersion slope of the input signal path and the pump path are small such that a third-order dispersion length associated with a desired temporal resolution is at least 10 times longer than the physical length of the input signal path and the pump path.

36. The method of claim 24 wherein the input dispersive element and/or the pump pulse dispersive element is a fiber with a small dispersion slope and the output dispersive element is a fiber with more dispersion than the input dispersive element and/or the pump pulse dispersive element.

37. The method of claim 24 wherein the signal waveform is stretched by a factor of at least 100×, 200×, 300×, 400×, or 500×.

38. The method of claim 24 wherein single-shot sampling of the signal waveform is produced.

39. The method of claim 24, further comprising:
making an amount of dispersion caused by dispersing the signal in the output dispersive element greater than an amount of dispersion caused by dispersing the input signal waveform in the input dispersive element.

40. The device of claim 19, wherein:
the input dispersive element for dispersing the input signal waveform is structured to cause an amount of dispersion in the input signal waveform less than an amount of dispersion in the pump pulse by the pump pulse dispersive element, and
the output dispersive element for dispersing the signal is structured to cause an amount of dispersion greater than an amount of dispersion caused by dispersing the input signal waveform caused by the input dispersive element.

41. The device of claim 40, wherein:
the input dispersive element for dispersing the input signal waveform is structured to cause an amount of dispersion in the input signal waveform less than an amount of dispersion in the pump pulse by the pump pulse dispersive element by at least one half.

42. The device of claim 1, wherein:
the input dispersive element for dispersing the input signal waveform is structured to cause an amount of dispersion in the input signal waveform less than an amount of dispersion in the pump pulse by the pump pulse dispersive element, and
the output dispersive element for dispersing the signal is structured to cause an amount of dispersion greater than an amount of dispersion caused by dispersing the input signal waveform caused by the input dispersive element.

43. The device of claim 42, wherein:
the input dispersive element for dispersing the input signal waveform is structured to cause an amount of dispersion in the input signal waveform less than an amount of dispersion in the pump pulse by the pump pulse dispersive element by at least one half.

* * * * *